US008589689B2

(12) United States Patent
Palanigounder et al.

(10) Patent No.: US 8,589,689 B2
(45) Date of Patent: Nov. 19, 2013

(54) APPARATUS AND METHOD FOR OVER-THE-AIR (OTA) PROVISIONING OF AUTHENTICATION AND KEY AGREEMENT (AKA) CREDENTIALS BETWEEN TWO ACCESS SYSTEMS

(75) Inventors: Anand Palanigounder, San Diego, CA (US); John Wallace Nasielski, San Diego, CA (US); Gregory Gordon Rose, San Diego, CA (US); Young Cheul Yoon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 586 days.

(21) Appl. No.: 12/777,048

(22) Filed: May 10, 2010

(65) Prior Publication Data
US 2011/0119492 A1 May 19, 2011

Related U.S. Application Data

(60) Provisional application No. 61/177,132, filed on May 11, 2009.

(51) Int. Cl.
*H04L 29/06* (2006.01)
*H04L 9/32* (2006.01)
(52) U.S. Cl.
USPC .......................... 713/171; 713/168; 713/150
(58) Field of Classification Search
None
See application file for complete search history.

(56) References Cited

U.S. PATENT DOCUMENTS

| | | | | |
|---|---|---|---|---|
| 7,469,151 B2* | 12/2008 | Khan et al. | ..................... | 455/558 |
| 7,519,358 B2* | 4/2009 | Benco et al. | .................. | 455/418 |
| 7,539,156 B2* | 5/2009 | Leung et al. | .................. | 370/313 |
| 7,970,398 B2* | 6/2011 | Palamara et al. | .......... | 455/435.1 |
| 8,296,835 B2* | 10/2012 | Calamera et al. | ................ | 726/9 |
| 2004/0127204 A1 | 7/2004 | Belmont | | |
| 2006/0039564 A1* | 2/2006 | Rao | .............................. | 380/270 |

FOREIGN PATENT DOCUMENTS

WO WO2006024599 A1 3/2006
WO WO2007071009 A1 6/2007

OTHER PUBLICATIONS

Over-The-Air Provisioning in CDMA; by Rohini P.P. Gemplus Technologies Oct. 2004.*
Understanding Over-the-Air Provisioning (OTAP), printed out in year 2012.*
RFC 5422 Network Working Group; Dynamic Provisioning Using Flexible Authentication via Secure Tunneling Extensible Authentication Protocol (EAP-FAST); N. Cam-Winget et al.; Mar. 2009.*
http://www.mctel.net/cat.php/en/ca39/ota-device-management-asp.html; MCTEL: OTA Provisioning; printed out in Dec. 31, 2012.*
Device Management Center Starter Kit OTA Provisioning and Statistics in ASP Mode; mcTel; printed out in year 2013.*

(Continued)

*Primary Examiner* — David Y Jung
(74) *Attorney, Agent, or Firm* — Kristine U Ekwueme

(57) ABSTRACT

A method and apparatus for over-the-air provisioning of authentication credentials at an access device via a first access system, wherein the authentication credentials are for a second access system lacking an over-the-air provisioning procedure. For example, the second access system may be a 3GPP system using AKA authentication methods. The first access system may be CDMA, using an OTASP or IOTA procedure. Provisioning the authentication credentials may include provisioning any of a 3GPP AKA authentication root key (K), AKA authentication related parameters, an AKA authentication algorithm to be used in the 3GPP authentication, or authentication algorithm customization parameters.

54 Claims, 10 Drawing Sheets

(56) References Cited

OTHER PUBLICATIONS

LTE Migration Strategies: Over-the-Air Provisioning Considerations; Wed, Jan. 11, 2012—7:28pm; by Chip Stevens, Interop Technologies; year 2012.*

Improved Robust User Authentication Scheme for Wireless Sensor Networks; Binod Vaidya et al.; year 2009.*

CDMA Over-The-Air (OTA) Provisioning © 2012 Interop Technologies; year 2012.*

3rd Generation Partnership Project; Technical Specification Group Services and System Aspects; 3G Security; Security architecture (Release 8), 3GPP Standard; 3GPP TS 33.102, 3rd Generation Partnership Project (3GPP), Mobile Competence Centre ; 650, Route Des Lucioles ; F-06921 Sophia-Antipolis Cedex ; France, No. V8.2.0, Mar. 1, 2009, pp. 1-67, XP050376422.

Ericsson: "On the introduction and use of UMTS AKA in GSM", 3GPP Draft; S3-040534, 3rd Generation Partnership Project (3GPP), Mobile Competence Centre ; 650, Route Des Lucioles ; F-06921 Sophia-Antipolis Cedex ; France, vol. SA WG3, No. Acapulco; Jun. 29, 2004, [retrieved on Jun. 29, 2004] p. 18, line 25-p. 28, line 10 20040629, XP050275768.

International Search Report and Written Opinion—PCT/US2010/034443—International Search Authority, European Patent Office, Jan. 17, 2011.

* cited by examiner

APPARATUS AND METHOD FOR OVER-THE-AIR (OTA) PROVISIONING OF AUTHENTICATION AND KEY AGREEMENT (AKA) CREDENTIALS BETWEEN TWO ACCESS SYSTEMS

CLAIM OF PRIORITY UNDER 35 U.S.C. §119

The present Application for Patent claims priority to Provisional Application No. 61/177,132 entitled "METHOD FOR OVER-THE-AIR (OTA) PROVISIONING OF 3GPP AUTHENTICATION AND KEY AGREEMENT (AKA) CREDENTIALS USING CDMA2000 SYSTEMS" filed May 11, 2009, and assigned to the assignee hereof and hereby expressly incorporated by reference herein.

BACKGROUND

1. Field

Aspects relate to over-the-air (OTA) provisioning of 3GPP authentication credentials for a 3GPP and/or 3GPP2 capable access device.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, Universal Mobile Telecommunications System (UMTS), Global Systems for Mobile Communications (GSM), and orthogonal frequency division multiple access (OFDMA) systems.

CDMA2000 systems (e.g., 1x, Evolution-Data Optimized "EVDO"/High-Rate-Packet-Date "HRPD") use over-the-air-service-provisioning (OTASP) and Internet Protocol (IP) over-the-air (IOTA) for OTA provisioning of authentication parameters such as identities, keys, etc. that are used for authentication.

However, evolving access systems, such as eHPRD, LTE, and 3GPP access systems, such as Universal Mobile Telecommunications System (UMTS)/High Speed Packet Access (HSPA), and the newer GSM systems, use the 3GPP Core Network for authentication using 3GPP Authentication and Key Agreement (AKA) authentication methods. These 3GPP authentication methods, such as AKA, assume that the authentication credentials to be used in the authentication method are already pre-configured on the access device. Therefore, authentication currently requires the authentication credentials to be pre-configured on a device before the device can access services. Typically, the authentication credentials are preconfigured on an application, such as, for example, Universal Subscriber Identity Module (USIM) or CDMA Universal Subscriber Identity Module (CSIM) on a smartcard such as a Universal Integrated Circuit Card (UICC). However, the authentication credentials may also be securely stored on the device, for example, in a secure storage, and execution environment, or Trusted Environment (TrE) of the device itself. This may be used especially for devices using non-3GPP accesses, such as Evolved HRPD (eHPRD) or even some 3GPP access capable devices which may not support a smartcard such as the UICC for authentication.

As current methods for 3GPP authentication require that access devices be pre-configured with authentication credentials for connecting to 3GPP-compliant core networks, the operator often needs to be chosen at the time of device manufacturing and/or a smartcard needs to be acquired separately before service can be obtained. Furthermore, if the credentials are compromised at any point, it is almost impossible to change them with the current methods. Thus, once credentials are compromised, a new device must be purchased.

Therefore, there exists a need in the art for a way to provision or replace 3GPP authentication credentials on an existing device. As more machine-to-machine devices that use the wireless systems for communications are emerging, this capability will become even more important.

SUMMARY

Aspects described herein meet these needs, by providing a way to provision credentials at any time after the device is manufactured. Thus, new credentials may be provisioned if there is a reason to believe that credentials have been compromised, such as due to service stealing.

Aspects may include a method for over-the-air provisioning, including connecting to a first access system; requesting over-the-air provisioning of authentication credentials for a second access system, wherein the second access system lacks an over-the-air provisioning procedure; receiving over-the-air provisioning of the authentication credentials for the second access system via the first access system; connecting to the second access system; and providing the provisioned authentication credentials to the second access system, in order to perform authentication with the second access system.

Aspects may further include an apparatus for receiving over-the-air provisioning, the apparatus including a transmitter for connecting to a first access system and a second access system; a processor for requesting, from the first access system, over-the-air provisioning of authentication credentials for the second access system, wherein the second access system lacks and over-the-air provisioning procedure; a receiver for receiving over-the-air provisioning of the authentication credentials for the second access system from the first access system; memory for storing the received over-the-air provisioning of the authentication credentials for the second access system; and a communications component for providing the provisioned authentication credentials to the second access system, in order to perform authentication with the second access system in order to establish a connection with the second access system.

Aspects may further include the authentication credentials being Authentication and Key Agreement (AKA) authentication credentials, and the method further including: performing AKA authentication with the second access system using the AKA authentication credentials.

The second access system may comprise a 3GPP core network and the first access system is a non-3GPP core network. The over-the-air provisioning may include establishing a key using a Diffie-Hellman based protocol or exchanging a password authentication key using a Diffie-Hellman protocol. The over-the-air provisioned authentication credentials may include at least one of a 3GPP AKA authentication root key (K), AKA authentication related parameters, or an AKA authentication algorithm to be used in the authentication with the second access system. The over-the-air provisioned authentication credentials may include AKA authentication related parameters, and wherein the AKA authentication related parameters include at least one of whether to use f5 for SQN concealment and the configuration of one or more SQN numbers for AKA SQN management. The over-the-air provisioned authentication credentials includes the AKA authentication algorithm to be used in the authentication with the second access system, with the method further including receiving over-the-air customization of the authentication algorithm from the first access system. The AKA authentication algorithm may be MILENAGE, and wherein customization of the authentication algorithm includes customization of an OP or an OPc parameter. The first access system comprises a CDMA2000 system. The over-the-air provisioning may be received via Over-the-Air Service Provisioning (OTASP). The over-the-air provisioning may be received via Internet-Over-the-Air (IOTA).

Aspects may further include an apparatus for receiving over-the-air provisioning, the apparatus including a transmitter for connecting to a first access system and a second access system; a processor for requesting, from the first access system, over-the-air provisioning of authentication credentials for the second access system, wherein the second access system lacks and over-the-air provisioning procedure; a receiver for receiving over-the-air provisioning of the authentication credentials for the second access system from the first access system; memory for storing the received over-the-air provisioning of the authentication credentials for the second access system; and a communications component for providing the provisioned authentication credentials to the second access system, in order to perform authentication with the second access system in order to establish a connection with the second access system.

Aspects may further include an apparatus for receiving over-the-air provisioning, the apparatus including means for connecting to a first access system and a second access system; means for requesting over-the-air provisioning of authentication credentials for a second access system, wherein the second access system lacks an over-the-air provisioning procedure; means for receiving over-the-air provisioning of the authentication credentials for the second access system from the first access system; and means for providing the provisioned authentication credentials to the second access system, in order to perform authentication with the second access system.

Aspects may further include at least one processor configured to receive over-the-air provisioning, the processor including a first module for connecting to a first access system; a second module for requesting over-the-air provisioning of authentication credentials for the second access system, wherein the second access system lacks an over-the-air provisioning procedure; a third module for receiving over-the-air provisioning of the authentication credentials for the second access system from the first access system; a fourth module for connecting to the second access system; and a fifth module for providing the provisioned authentication credentials to the second access system, in order to perform authentication with the second access system.

Aspects may further include a computer program product, comprising a computer-readable medium including a first set of codes for causing a computer to connect to a first access system; a second set of codes for causing a computer to request over-the-air provisioning of authentication credentials for the second access system, wherein the second access system lacks an over-the-air provisioning procedure; a third set of codes for causing a computer to receive over-the-air provisioning of the authentication credentials for the second access system; a fourth set of codes for causing a computer to connect to the second access system; and a fifth set of codes for causing a computer to provide the provisioned authentication credentials to the second access system, in order to perform authentication with the second access system.

Aspects may further include a method for performing over-the-air provisioning, the method including receiving a call origination from an access device at a first access system; directing the call to a provisioning system; determining the protocol capability of the access device; and performing over-the-air provisioning of authentication credentials at the access device via the first access system, wherein the authentication credentials are for the second access system lacking an over-the-air provisioning procedure.

Aspects may further include an apparatus for over-the-air provisioning, the apparatus including a receiver for receiving a call origination from an access device at a first access system; a processor for directing the call to a provisioning system and for determining the protocol capability of the access device; and a transmitter for performing over-the-air provisioning of authentication credentials at the access device via the first access system, wherein the authentication credentials are for the second access system lacking an over-the-air provisioning procedure.

Aspects may further include an apparatus for over-the-air provisioning, the apparatus including means for receiving a call origination from an access device at a first access system; means for directing the call to a provisioning system; means for determining the protocol capability of the access device; and means for performing over-the-air provisioning of authentication credentials at the access device via the first access system, wherein the authentication credentials are for the second access system lacking an over-the-air provisioning procedure.

Aspects may further include at least one processor configured to perform over-the-air provisioning, the processor including a first module for receiving a call origination from an access device at a first access system; a second module for directing the call to a provisioning system; a third module for determining the protocol capability of the access device; and a fourth module for performing over-the-air provisioning of authentication credentials at the access device via the first access system, wherein the authentication credentials are for the second access system lacking an over-the-air provisioning procedure.

Aspects may further include a computer program product, comprising a computer-readable medium including a first set of codes for causing a computer to receive a call origination from an access device at a first access system; a second set of codes for causing a computer to direct the call to a provisioning system; a third set of codes for causing a computer to determine the protocol capability of the access device; and a fourth set of codes for causing a computer to perform over-the-air provisioning of authentication credentials at the access device via the first access system, wherein the authentication credentials are for the second access system lacking an over-the-air provisioning procedure.

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

To the accomplishment of the foregoing and related ends, the one or more aspects comprise the features hereinafter fully described and particularly pointed out in the claims. The following description and the annexed drawings set forth in detail certain illustrative features of the one or more aspects.

These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
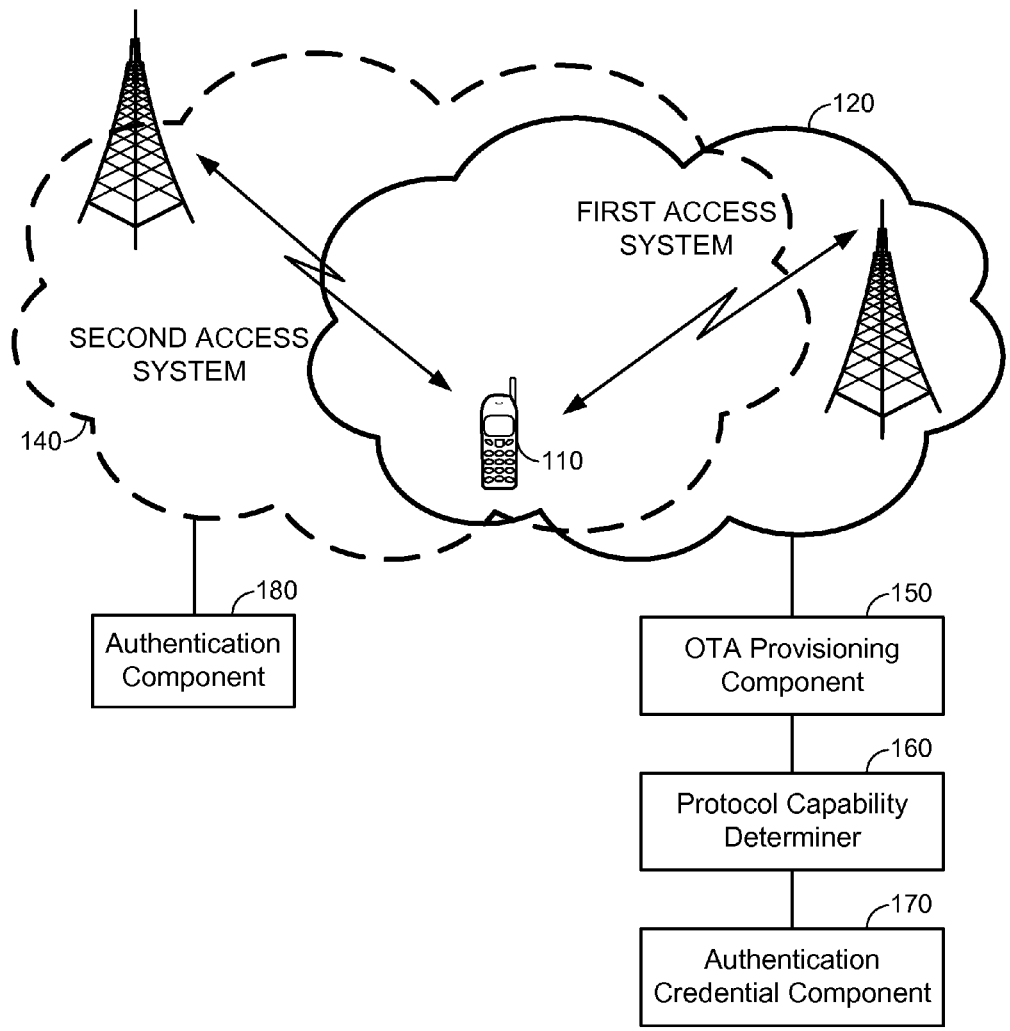
FIG. 1 illustrates aspects of an exemplary communication system to enable OTA provisioning of authentication credentials at an access device.

An explanation of various abbreviations used throughout this description is included with the first instance of use of the abbreviation or may be found at the end of the Detailed Description.

Certain access systems use OTA provisioning of their authentication parameters. For example, CDMA2000 systems, such as, 1x, EVDO/HRPD, use OTASP (C.S0016) and IOTA (C.S0040) for OTA provisioning of authentication parameters. The authentication parameters may include identities, keys, etc. that are used for authentication.

In contrast, 3GPP networks using AKA authentication methods currently require that authentication credentials be pre-configured on an access device before the access device can connect to the 3GPP network and access 3GPP services. These AKA authentication methods, for example, AKA specified in TS 3GPP 33.102, assume that the authentication credentials, such as the identities, secret keys, and an authentication algorithm to be used during authentication, are pre-configured on the mobile device before it can access services. For example, eHRPD (X.S0057) uses 3GPP Evolved Packet Core for authentication, which uses 3GPP AKA authentication methods and assumes that the authentication credentials are pre-configured on the access device.

Aspects provided herein overcome this problem by providing a way to provision the necessary 3GPP authentication credentials over-the-air using a separate access system. When an access device is capable of connecting to a first access technology, that access technology may be used to provision the 3GPP authentication credentials needed in order to access a 3GPP network. For example, an access device that is capable of accessing CDMA2000 can use OTASP to provision the 3GPP authentication credentials prior to 3GPP authentication. For example, 1x may be used to provision the 3GPP credentials. In other aspects, when an IP connection is available, IOTA may be used. Although examples are described for CDMA, OTASP, and IOTA, other access technologies are also applicable for provisioning the 3GPP authentication credentials. Access systems may be 3GPP or non-3GPP. For example, access systems that can use 3GPP core networks include, among others, HRPD/eHRPD (EV-DO), LTE, HSPA/UMTS, GSM, Worldwide Interoperability for Microwave Access (WiMAX), Wireless Local Area Network (WLAN), and even broadband access, such as, xDSL/cable modems. GSM may include any of its variants such as, among others, GPRS or EDGE for packet service. Furthermore, the solution is applicable to any device that connects to the core network specified by 3GPP. Among others, such networks may include Evolved Packet Core network, UMTS core network, and Internet Protocol (IP) multimedia system.

The 3GPP authentication credentials that can be provisioned OTA may include any of the 3GPP AKA authentication root key (K), AKA authentication related parameters, AKA authentication algorithm to be used in the 3GPP authentication, authentication algorithm customization parameters, such as the Operator Variant Algorithm Configuration (OP), and the OP Constant (OPc) for the MILENAGE authentication algorithm. OPc includes a combination of the OP (operator credential) with the root key k. This avoids the need to program OP into a smartcard, where it might be reverse engineered out of the smartcard. The AKA authentication related parameters may include among others, for example, whether to use an f5 authentication function for Sequence Number (SQN) concealment and the configuration of one or more SQN numbers for AKA SQN management. The AKA authentication algorithm, among others, may be MILENAGE as specified in TS 35.205 and 35.306. The MILENAGE authentication algorithm customization parameters may include, among others, OP or OPc. OP is a 128-bit operator variant algorithm configuration field that is used to derive the OPc or provision OPc directly. Similarly, other AKA authentication algorithms may use their own customization parameters, which can also be provisioned OTA using this invention.

For example, for EAP-AKA', the AKA credential includes the IMSI, a 128-bit root key (K), and a set of authentication functions ("f" functions). The required f functions for AKA are f1, f1*, f2, f3, f4, f5, and f5*. The set of f functions are also referred to as the AKA authentication algorithm functions. An AKA algorithm called MILENAGE is defined by 3GPP TS 35.205 and is used for eHRPD.

The Operator Variant Algorithm Configuration (OP) or OPc value is selected by an operator. OP is an Operator Variant Algorithm Configuration and is used by operators to customize the MILENAGE AKA algorithm. If OP is configured, then the OPc value is derived. MILENAGE also allows the operator to configure OPc directly. Thus, the access system, via OTASP, enables the configuration of OP and/or OPc.

The access system through which the OTA provisioning is provided to the access device may be a CDMA2000 system or any IP capable access system. As noted above, CDMA2000 systems use OTASP and IOTA for provisioning authentication parameters.

Therefore, when an IP connection is available to the device, such as through a wireless line or a wireless system, IOTA can be used to configure the 3GPP authentication credential parameters. IOTA is a transport protocol that can run on any access network that supports an IP connection. Otherwise, OTASP may be used to configure the 3GPP authentication credentials.

OTASP (over-the-air-service-provisioning) may include provisioning any of the following features over-the-air: downloading of Number Assignment Module (NAM) operational parameters, an Electronic Key Exchange for securely establishing the A-key and Root Key, System Selection for Preferred Roaming (SSPR) for providing mobile stations with information allowing acquisition of the preferred system in an area, a Preferred User Zone List (PUZL) for providing mobile stations which support the optional User Zone feature with information allowing usage of the preferred user zone in an area, and downloading of 3G packet data operational parameters. Service Programming Lock (SPL), if provided, may prevent the over-the-air provisioning of certain mobile station parameters by an unauthorized network entity.

Although exemplary implementations are described for Over-the-Air Service Provisioning (OTASP) in CDMA and analog systems, these procedures are extendable and flexible enough to be used with future air interface specifications. The procedures do not require support for continuation of the service provisioning process following a CDMA-to-analog handoff.

OTASP and/or IOTA provisioning messages may terminate on the device itself. In addition, the device may relay these messages to another secure computing platform/processor connected to the device with cellular/IP connectivity. The secure computing platform/processor may include, for example, a smart card or SIM card to which the access device relays the authentication credential information.

In one illustrative implementation, the access device connects to a wireless radio interface, such as CDMA, or to an IP connection. Once connected, the connection is used to perform a Diffie-Hellman Key Agreement between the access device and the network entity and establish the required root keys required for network access. This method may be used to provision devices that do not have any pre-shared information with the network. The Diffie-Hellman Key Agreement is used to provision 3GPP authentication credentials. Once the 3GPP authentication credentials are received, they may be used to connect to a 3GPP core network.

In another illustrative implementation, a password authenticated Diffie-Hellman key agreement is used to provision the access device. In this implementation, a password or key may be provided via a third entity using out-of-band means to be configured on the access device and the network entity performing the key agreement. The key agreement may use, for example, either a 1024-bit or a 2048-bit modulo prime.

The OTA provisioning of the 3GPP authentication credential may include AKA algorithm customization using an access technology, including OTASP or IOTA. Each operator can use their own AKA algorithm between an access device and a home network entity. Based on the capabilities of the network and the device, an indication or configuration that designates which algorithm is to be used between the device and the network can be made. For example, MILENAGE may be used. Once an algorithm is selected, the parameters needed for these algorithms may also be transferred using OTASP/IOTA messages. These parameters may include, for example, MILENAGE OP or OPc parameters.

FIG. 1 illustrates an exemplary network environment in which aspects described herein may occur. As shown in FIG. 1, a user equipment (UE) or mobile station 110 is located within range of a first access system 120 and a second access system 140. It is noted that each access system may include multiple access point base stations, for example. The second access system 140 lacks an over-the-air provisioning mechanism. The first access system includes an over-the-air provisioning mechanism. The mobile station 110 is capable of communication with both the first and second access system. The first access system is configured to perform over-the-air provisioning of the mobile station 110 not only for itself, but also for the second access system 140 that lack over-the-air provisioning capability. The mobile station is configured to receive over-the-air provisioning of the authentication credentials necessary to establish communication with the second access system via the first access system 120. The mobile station establishes communication with the first access system 120 and request over-the-air provisioning of authentication credentials for the second access system.

In response, the first access system 120 directs the call from the mobile station to a provisioning component 150 within the first access system. A protocol capability determiner 160 at the first access system determines the protocol capability of the mobile station. Then, the first access system 120 performs over-the-air provisioning of the authentication credentials to the mobile station, where the authentication credentials are for the second access system. This may be accomplished via an authentication credential component 170 at the first access system 120.

Once the mobile station has been provisioned, the mobile station establishes a connection with the second access system 140, and an authentication component 180 at the second access system authenticates the mobile station.

Figure 2:
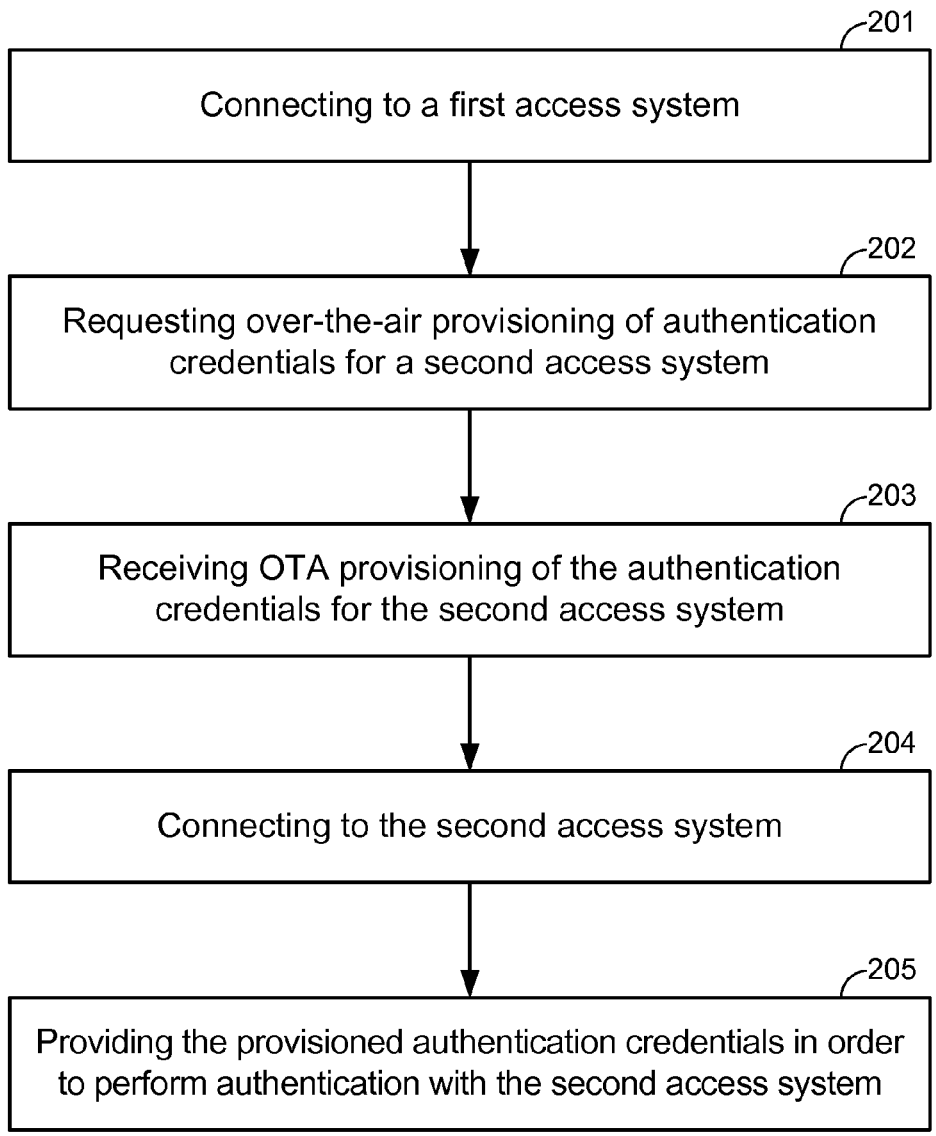
FIG. 2 illustrates aspects of an exemplary method for OTA provisioning of authentication credentials at an access device.

FIG. 2 illustrates aspects of an exemplary method for over-the-air provisioning of authentication credentials for an access device via a first access system, wherein the authentication credentials are for a second access system. The first access system may be a CDMA2000 system, using OTASP or IOTA. The second access system may be a 3GPP system using AKA authentication methods.

At 201, the access device connects to the first access system. At 202, the access device requests over-the-air provisioning of authentication credentials from the first access system, wherein the authentication credentials are for the second access system. At 203, the access device receives OTA provisioning of the authentication credentials for the second access system.

Over-the-air provisioning of the authentication credentials for the second access system may include a Diffie-Hellman key agreement or a password authenticated Diffie-Hellman key agreement. The authentication credentials that are provisioned may include any of a 3GPP AKA authentication root key (K), AKA authentication related parameters, and an AKA authentication algorithm to be used in the authentication with the second access system. AKA authentication related parameters may include at least one of whether to use f5 for SQN concealment or the configuration of one or more SQN numbers for AKA SQN management. Receiving over-the-air provisioned authentication credentials may further include receiving over-the-air customization of an AKA authentication algorithm from the first access system. For example, the AKA authentication algorithm may be MILENAGE, and the customization of the authentication algorithm may include customization of an OP or an OPc parameter.

At 204, the access device connects to the second access system. At 205, the access device provides the provisioned authentication credentials to the second access system, in order to perform authentication with the second access system. As noted above, the authentication credentials may be AKA authentication credentials, and the access device may perform AKA authentication with the second access system in order to access services at the second access system.

Figure 3:
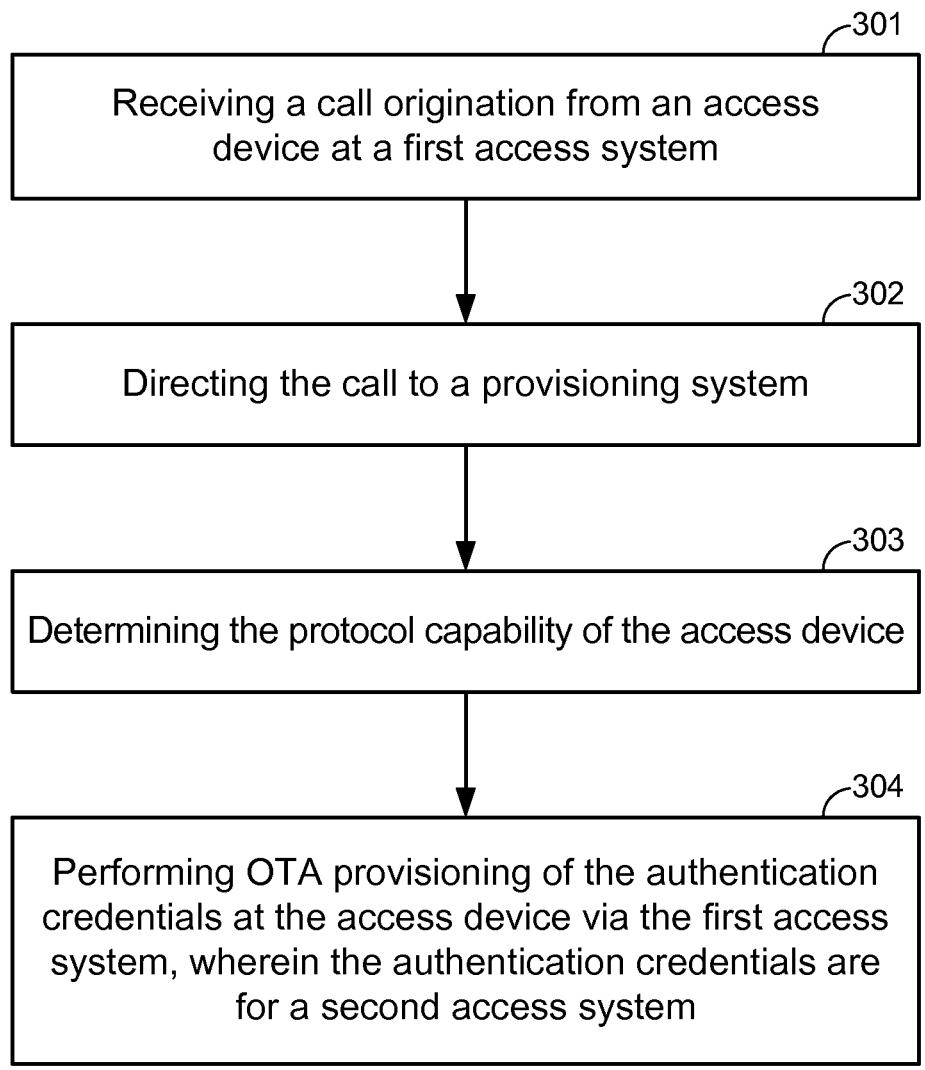
FIG. 3 illustrates aspects of an exemplary method for OTA provisioning of authentication credentials via an access system.

FIG. 3 illustrates aspects of an exemplary method for OTA provisioning, via a first access system, authentication credentials at an access device for a second access system. As noted above in connection with FIG. 2, the first access system may be a CDMA2000 system, using OTASP or IOTA. The second access system may be a 3GPP system using AKA authentication methods.

At 301, the first access system, such as a CDMA2000 network or an IP Connection Access Network (IP CAN), receives a call origination from an access device. At 302, the first access system directs the call to a provisioning system. Information may be further exchanged between the provisioning system and the access device. At 303, the first access system determines the protocol capability of the access device. This may include transmitting a protocol capability request to the access device.

At 304, the first access system performs OTA provisioning of the authentication credentials to the access device, such as via an OTASP/IOTA server, wherein the authentication credentials are for a second access system. This may include transmitting a MS Key Request and a Key Generation Request, as illustrated in further detail in FIG. 4.

Over-the-air provisioning of the authentication credentials for the second access system may include a Diffie-Hellman key agreement or a password authenticated Diffie-Hellman key agreement. The authentication credentials that are provisioned may include any of a 3GPP AKA authentication root key (K), AKA authentication related parameters, or an AKA authentication algorithm to be used in the authentication with the second access system. AKA authentication related parameters may include at least one of whether to use f5 for SQN concealment or the configuration of one or more SQN numbers for AKA SQN management. Receiving over-the-air provisioned authentication credentials may further include receiving over-the-air customization of an AKA authentication algorithm from the first access system. For example, the AKA authentication algorithm may be MILENAGE, and the customization of the authentication algorithm may include customization of an OP or an OPc parameter.

Aspects of an exemplary implementation using OTASP or IOTA will now be described in detail in connection with FIGS. 4 and 5. This illustration shows how 3GPP authentication credentials such as 3GPP AKA can be provisioned using OTA provisioning protocols, such as CDMA2000 OTASP.

First, at 401, a call is originated at the access device, also referred to interchangeably herein as the Mobile Station (MS), to the access network. FIG. 4 illustrates the MS originating a call via OTASP and the access network being either a CDMA2000 or IP CAN network. If the access system is IP CAN, IOTA may be used in place of OTASP. At 402, the access system redirects the call to customer care or a provisioning system. At 403, an information exchange is performed between the MS and the customer care or provisioning system. This information exchange may include, but not limited to, identification of the device, identification of the associated subscription information such as the identity of the customer, service requested and billing information, etc.

At 404, information such as the device identity (e.g., MEID/IMEI of the Mobile Equipment or ICCID/UIMID of the smartcard, if smartcard is used for storing credentials) to be provisioned, information required by the OTASP/IOTA server to successfully provision the device with the 3GPP authentication credentials, and allowed network services, etc., is transferred from the customer care or provisioning system to the OTASP/IOTA server. Then, at 405, the OTASP/IOTA server transmits a Protocol Capability Request, such as OTASP_P_REV=0 or 8, to the MS. At 406, the MS transmits an extended Capability Response. For example, this may include a key exchange or key agreement such as A_KEY_P_PREV with FEATURE_P_REV values of 00000111, signifying eHRPD Root Key provisioning and/or 000010000 signifying Enhanced eHRPD Root Key provisioning, as in Table 3.5.1.7-1 below.

At 407, the OTASP/IOTA server decides to perform 3GPP AKA credential provisioning for the MS.

At 408, the OTASP/IOTA server transmits a MS Key Request to the MS, such as A_KEY_P_REV=00000111 or 0000100.

At 409, the MS calculates a Mobile Station Result (MS_RESULT), as discussed in more detail below.

At 410, the MS transmits an MS Key Response, where RESULT=Success, to the OTASP or IOTA server. At 411, the OTASP or IOTA server calculates BS_RESULT, a base station result as discussed in more detail below.

At 412, the OTASP/IOTA server transmits a Key Generation Request, for example, with the BS_RESULT. At 413, the MS computes a 3GPP Root Key, for example, an eHRPD Root Key. At 414, the MS transmits a Key Generation Response, for example with MS_RESULT. At 415, the OTASP/IOTA server computes a 3GPP AKA Root Key. At 416, the OTASP/IOTA server determines whether to perform AKA algorithm provisioning or AKA algorithm customization. At 417, the 3GPP authentication credentials necessary for the MS to connect to a 3GPP network are transmitted from the OTASP/IOTA to the MS. Then, the MS is ready to perform AKA authentication with any 3GPP or 3GPP2 system that uses AKA for authentication.

Figure 4:
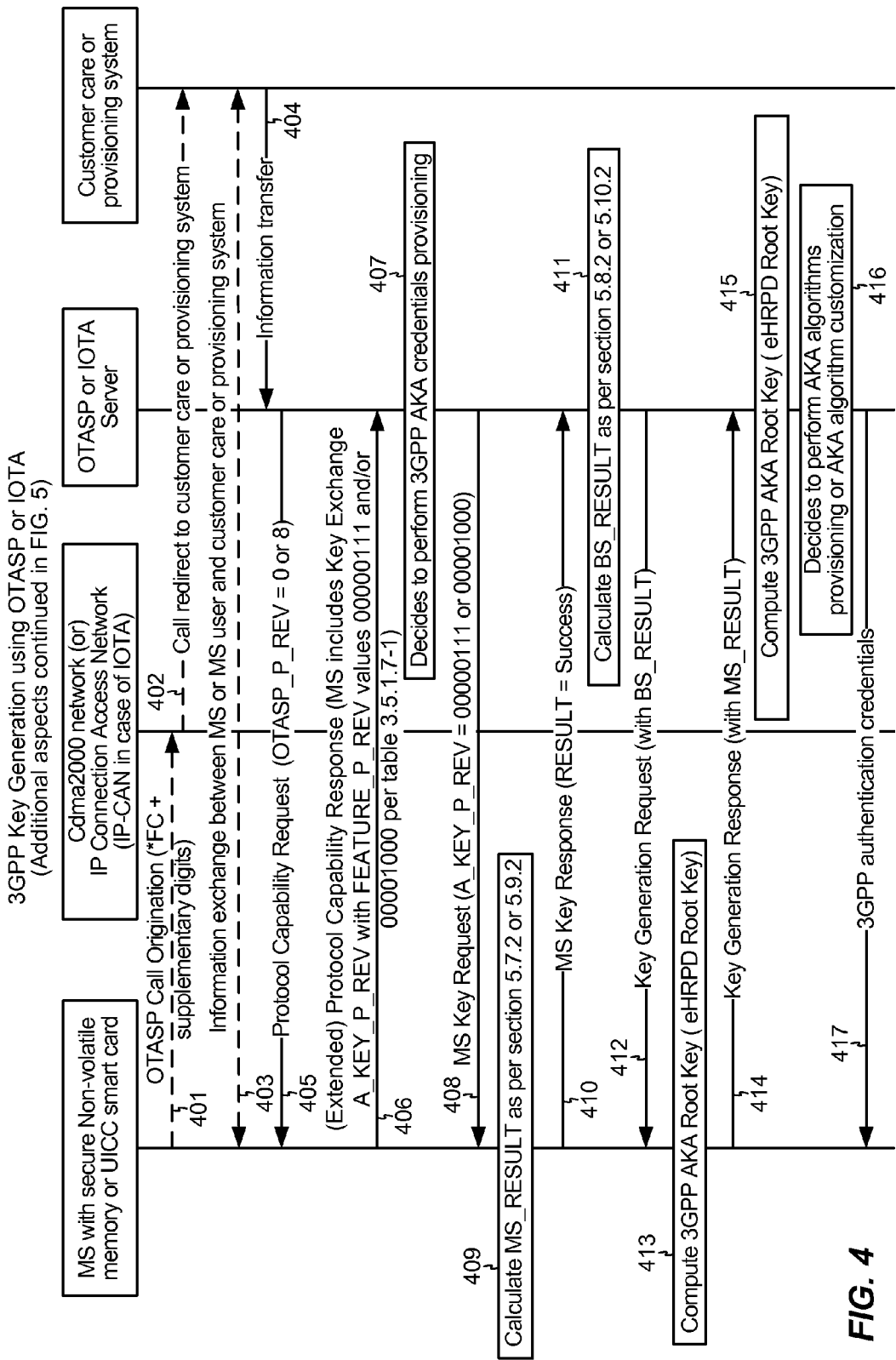
FIG. 4 illustrates aspects of an exemplary call flow diagram for OTA provisioning of authentication credentials for one access system via another access system.
Figure 5:
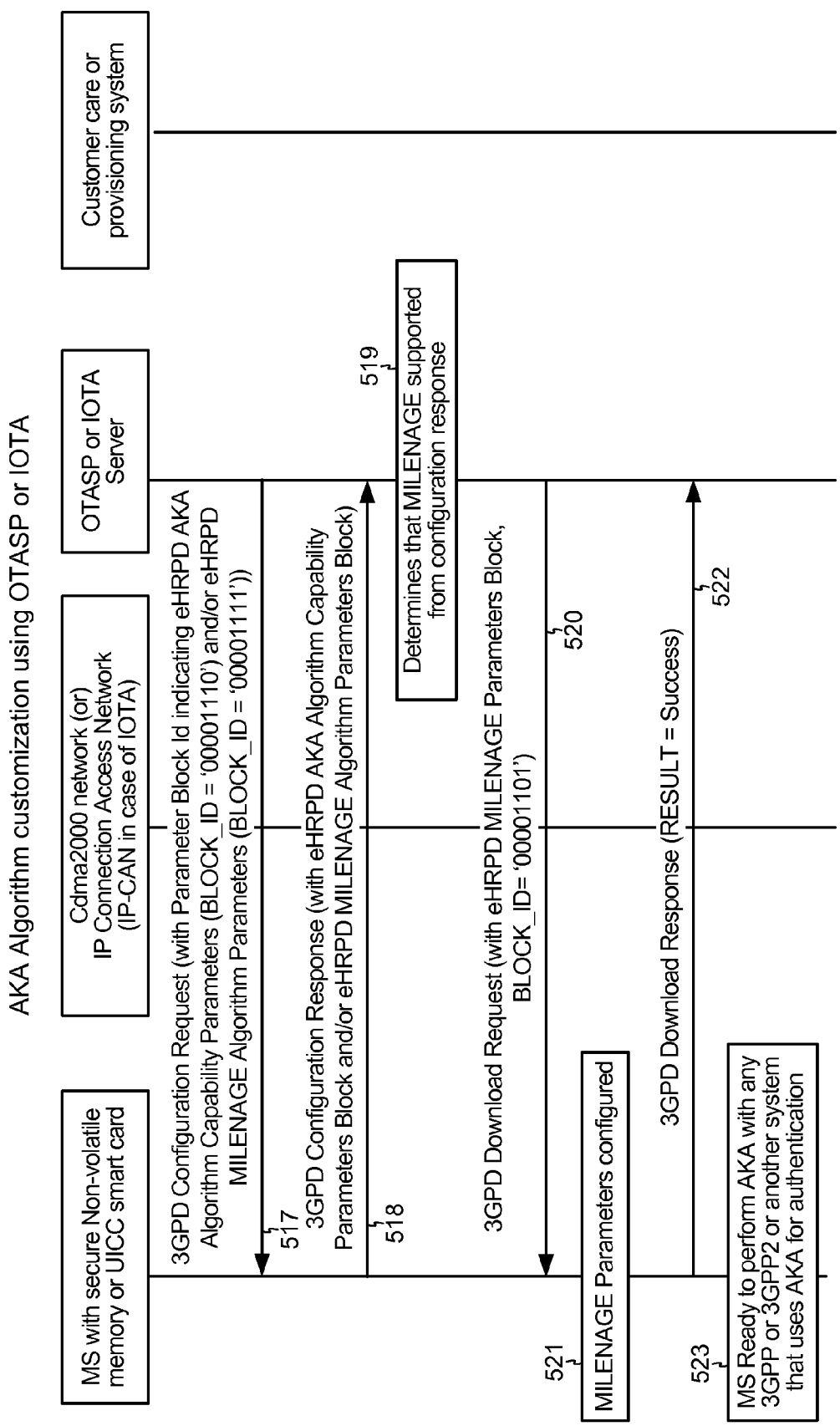
FIG. 5 illustrates additional aspects of an exemplary call flow diagram for OTA provisioning of authentication credentials for one access system via another access system.

FIG. 5 illustrates exemplary aspects of AKA Algorithm customization using OTASP/IOTA that may be performed in connection with the provisioning illustrated in FIG. 4.

At step 517, the OTASP/IOTA server transmits a Third Generation Packet Data (3GPD) Configuration Request to the MS, for example with Parameter Block Id indicating eHRPD AKA Algorithm Capability Parameters such as BLOCK_ID=00001110, and/or eHRPD MILENAGE Algorithm parameters, such as BLOCK_ID=00001111.

At step 518, the MS transmits a 3GPD Response to the OTASP/IOTA Server, such as with eHRPD AKA Algorithm Capability Parameters Block and/or eHRPD MILENAGE Algorithm Parameters Block. At 519, the OTASP/IOTA Server determines the Algorithm capabilities of the MS. For example, the OTASP/IOTA Server may determine that MILENAGE is supported at the MS from the received configuration response. At 520, the OTASP/IOTA Server transmits a Download Request, for example, with eHRPD MILENAGE Parameters Block, such as BLOCK_ID=00001101. At 521, the MS configures the MILENAGE Parameters based on the transmission from the OTASP/IOTA server. At 522, the MS transmits a 3GPS Download Response, for example RESULT=Success. At 523, the MS is ready to perform AKA authentication with any 3GPP or 3GPP2 system or with another system that uses AKA authentication.

OTASP Procedures are specified in C.S0016-D v1.0, IOTA procedures will likely be specified in future revisions of C.S0040-0 v1.0 (IOTA) and C.S0064-0 v1.0 (IOTA-DM), the entire contents of each of which are hereby incorporated by reference. The aspects illustrated in FIGS. 4 and 5 include the introduction of a new A_KEY_P_REV to support eHRPD Root Key generation and key exchange procedures, such as eHRPD Root Key Provisioning and Enhanced eHRPD Root Key provisioning, based on the existing 3G Root Key provisioning methods in OTASP. Where applicable, the use of SHA-1 may be replaced with SHA-26, because the hash functions for SHA-256 are more secure. Also illustrated is the introduction of two 3GPD Parameter Blocks, eHRPD AKA Algorithm Capability Parameters Block to indicate AKA algorithms (e.g. MILENAGE) supported by the MS and eHRPD MILENAGE Algorithm Parameters Block to configure the OP or the OPc parameters. In addition, the FEATURE_P_REV of 3GPD Feature Identifier is incremented to indicate the support for the added 3GPD Parameter Blocks.

The following describes exemplary aspects of the messages illustrated in FIGS. 4 and 5 in more details, with reference to sections listed below at the end of the Detailed Description.

Mobile Station Programming Procedures:

Initiation of the Programming Procedures, MS Key Request Message 3.3

If the mobile station has a stored eHRPD_k_TEMP$_S$, a secret 128-bit pattern temporarily stored in the mobile station, after receiving a Key Generation Request Message, it sets the value of the eHRPD_K$_p$, a secret 128-bit pattern permanently stored in the mobile station, NAM indicator equal to the eHRPD_K_TEMP$_S$.

Once the MS receives the MS Key Request as at 408, the MS calculates MS_RESULT. The mobile station shall set PARAM_Ps=PARAM_Pr and PARAM_Gs=PARAM_Gr if A_KEY_P_REV received in the MS Key Request Message='00000010'.

If A_KEY_P_REV received in the MS Key Request Message='00000011', '00000100', or '00000111', the mobile station shall set PARAM_Ps and PARAM_Gs to the values as specified below (at the end of the Detailed Description) in section 5.3.1, respectively.

If A_KEY_P_received in the MS Key Request Message='00000101' or '00001000', the mobile station shall set PARAM_Ps to the value specified in 5.3.1 and PARAM_Gs to the value specified in 5.5.1, respectively.

If the value of A_KEY_P_REV in the MS Key Request Message is not supported by the mobile station, the mobile station shall indicate the error condition by setting RESULT_CODE to '00000011', "Rejected—Protocol version mismatch." The mobile station shall send an MS Key Response Message within 750 ms after receiving this message.

If the value of A_KEY_P_REV in the MS Key Request Message is supported by the mobile station, the mobile station shall set RESULT_CODE to '00000000', "Accepted—Operation successful." The mobile station shall compute the MS_RESULT value according to the value of A_KEY_P_REV received in the MS Key Request Message as follows:

'00000010', calculate MS_RESULT in accordance with 5.1.2, e.g. MS_RESULT=PARAM_G$_s^X$ modulo PARAM_P$_s$;

'00000011', calculate MS_RESULT in accordance with 5.3.2, e.g. MS_RESULT=PARAM_G$_s^X$ modulo PARAM_P$_s$;

'00000100', calculate MS_RESULT in accordance with 5.3.2, e.g. MS_RESULT=PARAM_G$_s^X$ modulo PARAM_P$_s$;

'00000101', calculate MS_RESULT in accordance with 5.5.2, e.g. MS_RESULT=(MS_PW_HASH*PARAM_G$_s^X$) modulo PARAM_P$_s$, where MS_PW_HASH is calculated as the follows:

MS_PW_HASH=SHA-1 (0x00000001,0x00000001, MS_PW) modulo $2^{128}$|

SHA-1 (0x00000001,0x00000002, MS_PW) modulo $2^{128}$|

SHA-1 (0x00000001,0x00000003, MS_PW) modulo $2^{128}$|

SHA-1 (0x00000001,0x00000004, MS_PW) modulo $2^{128}$|

SHA-1 (0x00000001,0x00000005, MS_PW) modulo $2^{128}$|

SHA-1 (0x00000001,0x00000006, MS_PW) modulo $2^{128}$|

SHA-1 (0x00000001,0x00000007, MS_PW) modulo $2^{128}$|

SHA-1 (0x00000001,0x00000008, MS_PW) modulo $2^{128}$|

SHA-1 (0x00000001,0x00000009, MS_PW) modulo $2^{128}$.

MS_PW_HASH may be reduced modulo PARAM_P$_S$ prior to multiplication to simplify implementation. SHA-1 refers to the FIPS-180 hash function as specified in C.S0024-A, "cdma2000 *High Rate Packet Data Air Interface Specification*", April 2004.

'00000111', calculate MS_RESULT in accordance with 5.7.2, MS_RESULT=PARAM_G$_s^X$ modulo PARAM_P$_s$;

'00001000', calculate MS_RESULT in accordance with 5.9.2, MS_RESULT=(MS_PW_HASH$^2$*PARAM_G$_s^X$) modulo PARAM_P$_S$, where MS_PW_HASH is calculated as follows. SHA-256 refers to the FIPS-180-2 hash function as specified in National Institute of Standards and Technology: "Secure Hash Standard", FIPS 180-2, With Change Notice 1 dated February 2004, August 2002.

MS_PW_HASH=SHA-256 (0x00000001,0x00000001, MS_PW) modulo $2^{256}$

SHA-256 (0x00000001,0x00000002, MS_PW) modulo $2^{256}$|

SHA-256 (0x00000001,0x00000003, MS_PW) modulo $2^{256}$|

SHA-256 (0x00000001,0x00000004, MS_PW) modulo $2^{256}$|

SHA-256 (0x00000001,0x00000005, MS_PW) modulo $2^{128}$.

The return values should be treated as an integer The mobile station shall send an MS Key Response Message within 30 seconds after receiving this message.

If the mobile station is unable to compute the MS_RESULT value in accordance as described, the mobile station shall set RESULT_CODE to '00000001', "Rejected—Unknown reason." The mobile station shall send an MS Key Response Message within 30 seconds after receiving this message.

Key Generation Request Message

When the MS receives the Key Generation Request from the OTASP/IOTA server at 412, the MS transmits a response.

If the mobile station has not received an MS Key Request Message, the mobile station shall indicate the error condition by setting RESULT_CODE to '00000110', "Rejected—Message not expected in this mode." The mobile station shall send a Key Generation Response Message within 750 ms after receiving this message.

If the mobile station has received an MS Key Request Message and returned RESULT CODE other than '00000000', "Accepted—Operation successful," the mobile station shall indicate the error condition by setting RESULT_CODE to '00000110', "Rejected—Message not expected in this mode." The mobile station shall send a Key Generation Response Message within 750 ms after receiving this message.

If the mobile station has received an Key Generation Request Message with the value of BS_RESULT equal to 0, the mobile station shall set RESULT_CODE to '00000001', "Rejected—Unknown reason." The mobile station shall then send a Key Generation Response Message within 750 ms after receiving this message.

Otherwise, the mobile station shall compute the value of the A-key, A-key and Root Key combination, or (eHRPD) Root Key if the value of A_KEY_P_REV received in the MS Key Request Message equals to:

'00000010', calculate A-key in accordance with 5.1.3, e.g. the mobile station shall compute the common key K=BS_RESULT$_S^X$ modulo PARAM_P$_S$. The mobile station shall store the least significant 64 bits of the result K as A_KEY_TEMP$_S$;

'00000011', calculate A-key and Root Key in accordance with 5.3.3;

'00000100', calculate Root Key in accordance with 5.3.4, e.g. the mobile station shall compute the Root Key RK=BS_RESULT$_S^X$ modulo PARAM_P$_S$. The mobile station shall store the least significant 128 bits of the result RK as RK_TEMP$_S$;

'00000101', calculate Root Key in accordance with 5.5.3;

'00000111', calculate eHRPD Root Key in accordance with 5.7.3, e.g. eHRPD Root Key eRK=BS_RESULT$_S^X$ modulo PARAM_P$_S$. The mobile station shall store the least significant 128 bits of the result eRK as eHRPD_K_TEMPs;

'00001000', calculate eHRPD Root Key in accordance with 5.9.3, e.g eHRPD Root Key eRK=SHA-256 (0x00000003|0x00000C80 (This value is set to the length of MS_PARAM in bits.)|MS_PARAM|MS_PARAM), where MS_PARAM=MS_PW|
PARAM_G$_S^X$ modulo PARAM_P$_S$|
(BS_RESULT$_S$/BS_PW_HASH) modulo PARAM_P$_S$|
((BS_RESULT$_S$/BS_PW_HASH)$^X$) modulo PARAM_P$_S$.

The mobile station shall store the least significant 128 bits of the result eRK as eHRPD_K_TEMPs.

If the mobile station has not successfully calculated the A-key, A-key and Root Key combination, or (eHRPD) Root Key as described, respectively, the mobile station shall set RESULT_CODE to '00000001', "Rejected—Unknown reason." The mobile station shall then send a Key Generation Response Message within 30 seconds after receiving this message.

If the mobile station has successfully calculated the A-key, A-key and Root Key combination, or (eHRPD) Root Key as described, respectively, the mobile station shall set RESULT_CODE to '00000000', "Accepted—Operation successful". The mobile station shall then send a Key Generation Response Message within 30 seconds after receiving this message.

Key Generation Response Message, 3.5.1.4

At 414, the MS transmits a Key Generation Response Message. The Key Generation Response Message has the following variable-length format:

| Field | Length (bits) |
|---|---|
| OTASP_MSG_TYPE ('00000011') | 8 |
| RESULT_CODE | 8 |
| MS_RESULT_LEN | 8 |
| MS_RESULT | 8 × MS_RESULT_LEN |

OTASP_MSG_TYPE—OTASP Data Message Type.
The mobile station shall set this field to '00000011'.

RESULT_CODE—Key Exchange Result Code.
The mobile station shall set this field to indicate acceptance or rejection status, using the values defined in Table 3.5.1.2-1.

MS_RESULT_LEN—Length of MS_RESULT Field.
The mobile station shall set this field to the number of octets in the MS_RESULT field.

MS_RESULT—Mobile Station Calculation Result.
If A_KEY_P_REV received in the MS Key Request Message is equal to '00000010', the mobile station shall set this field equal to the value of MS_RESULT as described in 5.1.2, MS_RESULT=PARAM_G$_S^X$ modulo PARAM_P$_S$.

If A_KEY_P_REV received in the MS Key Request Message is equal to '00000011' or '00000100', the mobile station shall set this field equal to the value of MS_RESULT as described in 5.3.2, MS_RESULT=PARAM_G$_S^X$ modulo PARAM_P$_S$.

If A_KEY_P_REV received in the MS Key Request Message is equal to '00000101', the mobile station shall set this field to the value of MS_RESULT as described in 5.5.2, or MS_PW_HASH as the follows:

MS_PW_HASH=SHA-1 (0x00000001,0x00000001, MS_PW) modulo $2^{128}$|
SHA-1 (0x00000001,0x00000002, MS_PW) modulo $2^{128}$|
SHA-1 (0x00000001,0x00000003, MS_PW) modulo $2^{128}$|
SHA-1 (0x00000001,0x00000004, MS_PW) modulo $2^{128}$|
SHA-1 (0x00000001,0x00000005, MS_PW) modulo $2^{128}$|
SHA-1 (0x00000001,0x00000006, MS_PW) modulo $2^{128}$|
SHA-1 (0x00000001,0x00000007, MS_PW) modulo $2^{128}$|
SHA-1 (0x00000001,0x00000008, MS_PW) modulo $2^{128}$|
SHA-1 (0x00000001,0x00000009, MS_PW) modulo $2^{128}$.

The mobile station shall calculate MS_RESULT= (MS_PW_HASH*PARAM_G$_S^X$) modulo PARAM_P$_S$. SHA-1 refers to the FIPS-180 hash function as specified in C.S0024-A, "*cdma2000 High Rate Packet Data Air Interface Specification*", April 2004. MS_PW_HASH may be reduced modulo PARAM_P$_S$ prior to multiplication to simplify implementation.

If A_KEY_P_REV received in the MS Key Request Message is equal to '00000111', the mobile station shall set this field to the value of MS_RESULT as described in 5.7.2, MS_RESULT=PARAM_G$_S^X$ modulo PARAM_P$_S$.

If A_KEY_P_REV received in the MS Key Request Message is equal to '00001000', the mobile station shall set this field to the value of MS_RESULT as described in 5.9.2, the mobile station shall calculate MS_PW_HASH as the follows:

MS_PW_HASH=SHA-256 (0x00000001,0x00000001, MS_PW) modulo $2^{256}$|
SHA-256 (0x00000001,0x00000002, MS_PW) modulo $2^{256}$|
SHA-256 (0x00000001,0x00000003, MS_PW) modulo $2^{256}$|
SHA-256 (0x00000001,0x00000004, MS_PW) modulo $2^{256}$|
SHA-256 (0x00000001,0x00000005, MS_PW) modulo $2^{128}$.

The return value should be treated as an integer. SHA-256 refers to the FIPS-180-2 hash function as specified in National Institute of Standards and Technology: "Secure Hash Standard", FIPS 180-2, With Change Notice 1 dated February 2004, August 2002. The mobile station shall calculate MS_RESULT=(MS_PW_HASH*PARAM_$G_S^X$) modulo PARAM_$P_S$. MS_PW_HASH may be reduced modulo PARAM_$P_S$ prior to multiplication to simplify implementation.

The eHRPD_DATA AKA Algorithm Capability Parameters, 3.5.8.15

The PARAM_DATA field of the eHRPD AKA Algorithm Capability Parameter Block consists of AKA_ALGORITHM with a length of 8 bits

| Field | Length (bits) |
|---|---|
| AKA_ALGORITHM | 8 |

AKA_ALGORITHM—eHRPD AKA authentication algorithms Bitmap to indicate which authentication algorithms are supported by the mobile station. The mobile station shall set this field to the value in the form of bitmap as follows:

| Subfield | Length (bits) | Subfield Description |
|---|---|---|
| MILENAGE | 1 | MILENAGE supported as specified in [TS 35.205] |
| RESERVED | 7 | — |

The Mobile Station shall set each subfield to '1', if the corresponding operating mode is supported by the mobile station; otherwise the mobile station shall set the subfield to '0'.

RESERVED—Reserved bits. The mobile station shall add reserved bits as needed in order to make the length of the entire parameter block equal to an integer number of octets. The mobile station shall set this field to '0000000'.

eHRPD MILENAGE Algorithm Parameters, 3.5.8.16

The eHRPD MILENAGE Algorithm Parameters include the following fields:

| Field | Length (bits) |
|---|---|
| OP_PARAM_VALUE | 128 |
| OP_PARAM_TYPE | 1 |
| RESERVED | 7 |

OP_PARAM_VALUE—128-bit MILENAGE Operator Variant Algorithm Configuration Field (see to [TS 35.205]).

OP_PARAM_TYPE—If this bit is '0', the mobile station shall treat OP_PARAM_VALUE as the OP parameter defined in [bb]; otherwise, the mobile station shall treat OP_PARAM_VALUE as the $OP_c$ parameter defined in [TS 35.205].

RESERVED—Reserved bits. Additional reserved bits are needed in order to make the length of the entire parameter block equal to an integer number of octets. The mobile station shall set these bits to '0'.

Base Station Procedures

MS Key Request Message, 4.5.1.3

As illustrated in FIG. 4, at 408 a MS Key Request message is transmitted from the access system to the MS. The MS Key Message has the following variable-length format:

| Field | Length (bits) |
|---|---|
| OTASP_MSG_TYPE ('00000010') | 8 |
| A_KEY_P_REV | 8 |
| PARAM_P_LEN | 0 or 8 |
| PARAM_P | 0 or 8 × PARAM_P_LEN |
| PARAM_G_LEN | 0 or 8 |
| PARAM_G | 0 or 8 × PARAM_G_LEN |

OTASP_MSG_TYPE-OTASP Data Message type. The base station shall set this field to '00000010'.

A_KEY_P_REV-Key exchange protocol version. The base station shall set this field to '00000010' for 2G A-key generation, '00000011' for combination 2G A-key and 3G Root Key generation, '00000100' for 3G Root Key generation, or '00000101' for Enhanced 3G Root Key generation, '00000111' for eHRPD Root Key generation, or '00001000' for Enhanced eHRPD Root Key generation.

PARAM_P_LEN—Length of PARAM_P field. If A_KEY_P_REV='00000010', the base station shall set this field to the number of octets in the PARAM_P field, and the base station shall set this field to '01000000'. If A_KEY_P_REV>'00000010', the base station shall omit this field.

PARAM_P—Key exchange parameter P. If A_KEY_P_REV='00000010', the base station shall set this field as described in 5.2.1. If A_KEY_P_REV>'00000010', the base station shall omit this field.

PARAM_G_LEN—Length of PARAM_G field. If A_KEY_P_REV='00000010', the base station shall set this field to the number of octets in the PARAM_G field, and the base station shall set this field to '00010100'. If A_KEY_P_REV>'00000010', the base station shall omit this field.

PARAM_G—Key exchange parameter G. If A_KEY_P_REV='00000010', the base station shall set this field as described in 5.2.1. If A_KEY_P_REV>'00000010', the base station shall omit this field.

Key Generation Request Message, 4.5.1.4

At 312, a Key Generation Request Message is transmitted to the MS. The Key Generation Request Message has the following variable-length format:

| Field | Length (bits) |
|---|---|
| OTASP_MSG_TYPE ('00000011') | 8 |
| BS_RESULT_LEN | 8 |
| BS_RESULT | 8 × BS_RESULT_LEN |

OTASP_MSG_TYPE—OTASP Data Message type. The base station shall set this field to '00000011'.

BS_RESULT_LEN—Length of BS_RESULT field. The base station shall set this field to the number of octets in the BS_RESULT field.

BS_RESULT—Base station calculation result. If A_KEY_P_REV='00000010', the base station shall set this field equal to the value of BS_RESULT as described in 5.2.2, e.g. the base station shall calculate BS_RESULT=PARAM_$G^Y$ modulo PARAM_P. If A_KEY_P_REV='00000011' or '00000100', the base station shall set this field equal to the value of BS_RESULT as described in 5.4.2, e.g. BS_RESULT=PARAM_$G^Y$ modulo PARAM_P. If A_KEY_P_REV='00000101', the base station shall set this field equal to the value of BS_RESULT as described in 5.6.2. If A_KEY_P_REV='00000111', the base station shall set this field equal to the value of BS_RESULT as described in 5.8.2. If A_KEY_P_REV='00001000', the base station shall set this field equal to the value of BS_RESULT as described in 5.10.2.

eHRPD MILENAGE Algorithm Parameters, 4.5.7.11

The PARAM_DATA field of the eHRPD MILENAGE Algorithm Parameters Block consists of the following fields:

| Field | Length (bits) |
|---|---|
| OP_PARAM_VALUE | 128 |
| OP_PARAM_TYPE | 1 |
| RESERVED | 7 |

OP_PARAM_VALUE—128-bit MILENAGE Operator Variant Algorithm Configuration Field (refer to [TS 35.205]).

OP_PARAM_TYPE—The base station shall set this bit to '0', if the OP_PARAM_VALUE is to be interpreted by the mobile station as the OP parameter defined in [TS35.205]; otherwise, the base station shall set this bit to '1' to indicate to the mobile station that the OP_PARAM_VALUE is to be interpreted as the OP, parameter defined in [TS35.205].

RESERVED—Reserved bits. Additional reserved bits are needed in order to make the length of the entire parameter block equal to an integer number of octets. The base station shall set these bits to '0'.

Key Exchange Procedures, 5

Mobile Station Requirements for A_KEY_P_REV='00000111', 5.7

The Random Number Generation for Diffie-Hellman Key Agreement Procedure includes the following. The mobile station shall set PARAM_$P_S$ for use in calculating the mobile station result, MS_RESULT, to the 1024-bit prime number (Most Significant Bit first) specified in 5.3.1. The mobile station shall set PARAM_$G_S$ for use in calculating MS_RESULT to '00000010'. The mobile station shall generate a random number X for use in calculating MS_RESULT. The number X shall have the properties listed in 5.5.1.

For the Mobile Station Result, the mobile station shall calculate MS_RESULT=PARAM_$G_S^X$ modulo PARAM_$P_S$.

For the eHRPD Root Key Computation for A_KEY_P_REV='00000111', the mobile station shall compute the eHRPD Root Key eRK=BS_RESULT$_S^X$ modulo PARAM_$P_S$. The mobile station shall store the least significant 128 bits of the result eRK as eHRPD_K_TEMP$_S$.

Base Station Requirements for A_KEY_P_REV='00000111', 5.8

Generation of the Key Exchange Parameters Root Key, 5.8.1

Generation of the Key Exchange Parameters Root Key includes the following: The base station shall set PARAM_$P_S$ for use in calculating the base station result, BS_RESULT, to the 1024-bit prime number (Most Significant Bit first) specified in 5.4.1. The base station shall set PARAM_$G_S$ for use in calculating BS_RESULT to '00000010'. The base station shall generate a random number Y for use in calculating BS_RESULT. The number Y shall have the properties listed in 5.6.1.

Base Station Result, 5.8.2

For the base station result, the base station shall calculate BS_RESULT=PARAM_$G^Y$ modulo PARAM_P.

eHRPD Root Key eHRPD_K Computation for A_KEY_P_REV='00000111', 5.8.3

For the eHRPD Root Key eHRPD_K Computation for A_KEY_P_REV='00000111', the base station shall compute the eHRPD Root Key eRK=MS_RESULT$^Y$ modulo PARAM_P. The base station shall use the least significant 128 bits of the result eRK as the eHRPD Root Key eHRPD_K.

Mobile Station Requirements for A_KEY_P_REV='00001000', 5.9

Random Number Generation and Key Generation Parameters, 5.9.1

Random Number Generation and Key Generation Parameters include the following. The mobile station shall set PARAM_$P_S$ for use in calculating the mobile station result, MS_RESULT, to the 1024-bit prime number as specified in 5.3.1. The mobile station shall set PARAM_$G_S$ for use in calculating MS_RESULT to '00001101'. The mobile station shall generate a random number X for use in calculating MS_RESULT. The number X shall have the properties listed in 5.5.1.

Mobile Station Result, 5.9.2

For the Mobile Station Result, the mobile station shall calculate MS_PW_HASH as the follows:

MS_PW_HASH=SHA-256 (0x00000001,0x00000001, MS_PW) modulo $2^{256}$|

SHA-256 (0x00000001,0x00000002, MS_PW) modulo $2^{256}$|

SHA-256 (0x00000001,0x00000003, MS_PW) modulo $2^{256}$|

SHA-256 (0x00000001,0x00000004, MS_PW) modulo $2^{256}$|

SHA-256 (0x00000001,0x00000005, MS_PW) modulo $2^{128}$.

The mobile station shall calculate MS_RESULT= (MS_PW_HASH*PARAM_$G_S^X$) modulo PARAM_$P_S$. SHA-256 refers to the FIPS-180-2 hash function as specified in C.S0024-A, "*cdma2000 High Rate Packet Data Air Interface Specification*", April 2004. MS_PW_HASH may be reduced modulo PARAM_$P_S$ prior to multiplication to simplify implementation.

eHRPD Root Key Computation for A_KEY_P_REV='00001000', 5.9.3

For the eHRPD Root Key Computation for A_KEY_P_REV='00001000', the mobile station shall compute the eHRPD Root Key eRK=SHA-256 (0x00000003|0x00000080 (This is set to the length of MS_PARAM in bits.)|MS_PARAM|MS_PARAM), where MS_PARAM=MS_PW|

PARAM_$G_S^X$ modulo PARAM_$P_S$|

(BS_RESULT$_S$/BS_PW_HASH) modulo PARAM_$P_S$|

((BS_RESULT$_S$/BS_PW_HASH)$^X$) modulo PARAM_$P_S$.

The mobile station shall store the least significant 128 bits of the result eRK as eHRPD_K_TEMP$_S$.

Base Station Requirements for A_KEY_P_REV='00001000', 5.10

Base Number Generation and Key Generation Parameters, 5.10.1

Random Number Generation and Key Generation Parameters include the following. The base station shall set PARAM_$P_S$ for use in calculating the base station result, BS_RESULT, to the 1024-bit prime number (Most Significant Bit first) specified in 5.4.1. The base station shall set PARAM_$G_S$ for use in calculating BS_RESULT to '00001101'. The base station shall generate a random number Y for use in calculating BS_RESULT. The number Y shall have the properties listed in 5.6.1.

Base Station Result, 5.10.2

For the Base Station Result, the base station shall calculate BS_PW_HASH where

BS_PW_HASH=SHA-256 (0x00000002,0x00000001, BS_PW) modulo $2^{256}$|

SHA-256 (0x00000002,0x00000002, BS_PW) modulo $2^{256}$|

SHA-256 (0x00000002,0x00000003, BS_PW) modulo $2^{256}$|

SHA-256 (0x00000002,0x00000004, BS_PW) modulo $2^{256}$|

SHA-256 (0x00000002,0x00000005, BS_PW) modulo $2^{128}$.

The base station shall calculate BS_RESULT=(BS_PW_HASH*PARAM_G$^Y$) modulo PARAM_P$_S$. BS_PW_HASH may be reduced modulo PARAM_P$_S$ prior to multiplication to simplify implementation.

eHRPD Root Key eHRPD_K Computation, 5.10.3

For eHRPD Root Key eHRPD_K Computation, the base station shall compute the eHRPD Root Key eRK=SHA-256 (0x00000003|0x00000C80 (This value is set to the length of BS_PARAM in bits.)|BS_PARAM|BS_PARAM), where

BS_PARAM=BS_PW|

(MS_RESULT/MS_PW_HASH) modulo PARAM_P$_S$|

PARAM_G$^Y$ modulo PARAM_P$_S$|

((MS_RESULT/MS_PW_HASH)$^Y$) modulo PARAM_P$_S$.

The base station shall use the least significant 128 bits of the result eRK as the eHRPD Root Key eHRPD_K.

Figure 6:
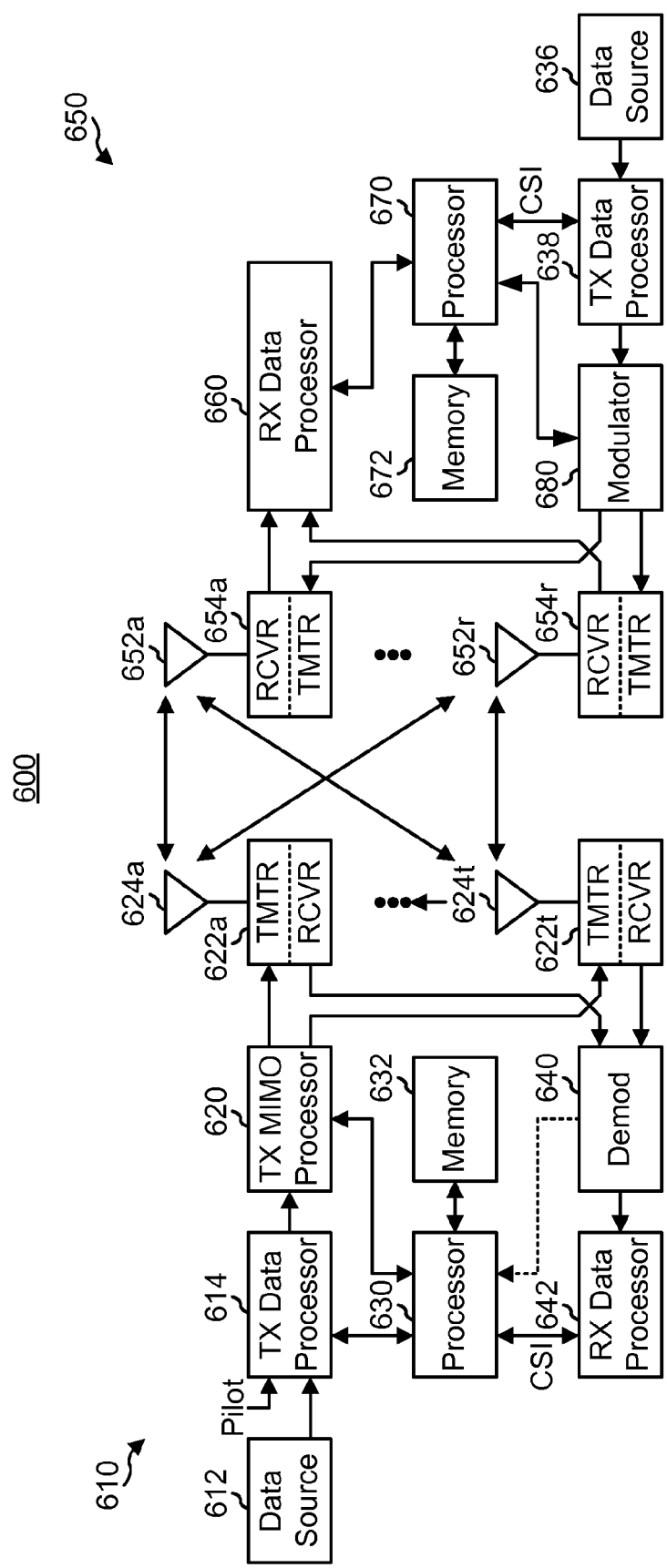
FIG. 6 illustrates a block diagram of a communication system.

FIG. 6 is a block diagram of an embodiment of a communication system, which may be configured to perform the above-described methods, including a transmitter system 610 (also known as the access point) and a receiver system 650 (also known as access terminal) in a MIMO system 600. At the transmitter system 610, traffic data for a number of data streams is provided from a data source 612 to a transmit (TX) data processor 614.

In an embodiment, each data stream is transmitted over a respective transmit antenna. TX data processor 614 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 630.

The modulation symbols for all data streams are then provided to a TX MIMO processor 602, which may further process the modulation symbols (e.g., for OFDM). TX MIMO processor 620 then provides N$_T$ modulation symbol streams to N$_T$ transmitters (TMTR) 622a through 622t. In certain embodiments, TX MIMO processor 620 applies beamforming weights to the symbols of the data streams and to the antenna from which the symbol is being transmitted.

Each transmitter 622 receives and processes a respective symbol stream to provide one or more analog signals, and further conditions (e.g., amplifies, filters, and upconverts) the analog signals to provide a modulated signal suitable for transmission over the MIMO channel. N$_T$ modulated signals from transmitters 622a through 622t are then transmitted from N$_T$ antennas 624a through 624t, respectively.

At receiver system 650, the transmitted modulated signals are received by N$_R$ antennas 652a through 652r and the received signal from each antenna 652 is provided to a respective receiver (RCVR) 654a through 654r. Each receiver 654 conditions (e.g., filters, amplifies, and downconverts) a respective received signal, digitizes the conditioned signal to provide samples, and further processes the samples to provide a corresponding "received" symbol stream.

An RX data processor 660 then receives and processes the N$_R$ received symbol streams from N$_R$ receivers 654 based on a particular receiver processing technique to provide N$_T$ "detected" symbol streams. The RX data processor 660 then demodulates, deinterleaves, and decodes each detected symbol stream to recover the traffic data for the data stream. The processing by RX data processor 660 is complementary to that performed by TX MIMO processor 620 and TX data processor 614 at transmitter system 610.

A processor 670 periodically determines which pre-coding matrix to use (discussed below). Processor 670 formulates a reverse link message comprising a matrix index portion and a rank value portion.

The reverse link message may comprise various types of information regarding the communication link and/or the received data stream. The reverse link message is then processed by a TX data processor 638, which also receives traffic data for a number of data streams from a data source 636, modulated by a modulator 680, conditioned by transmitters 654a through 654r, and transmitted back to transmitter system 610.

At transmitter system 610, the modulated signals from receiver system 650 are received by antennas 624, conditioned by receivers 622, demodulated by a demodulator 640, and processed by a RX data processor 642 to extract the reserve link message transmitted by the receiver system 650. Processor 630 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

Figure 7:
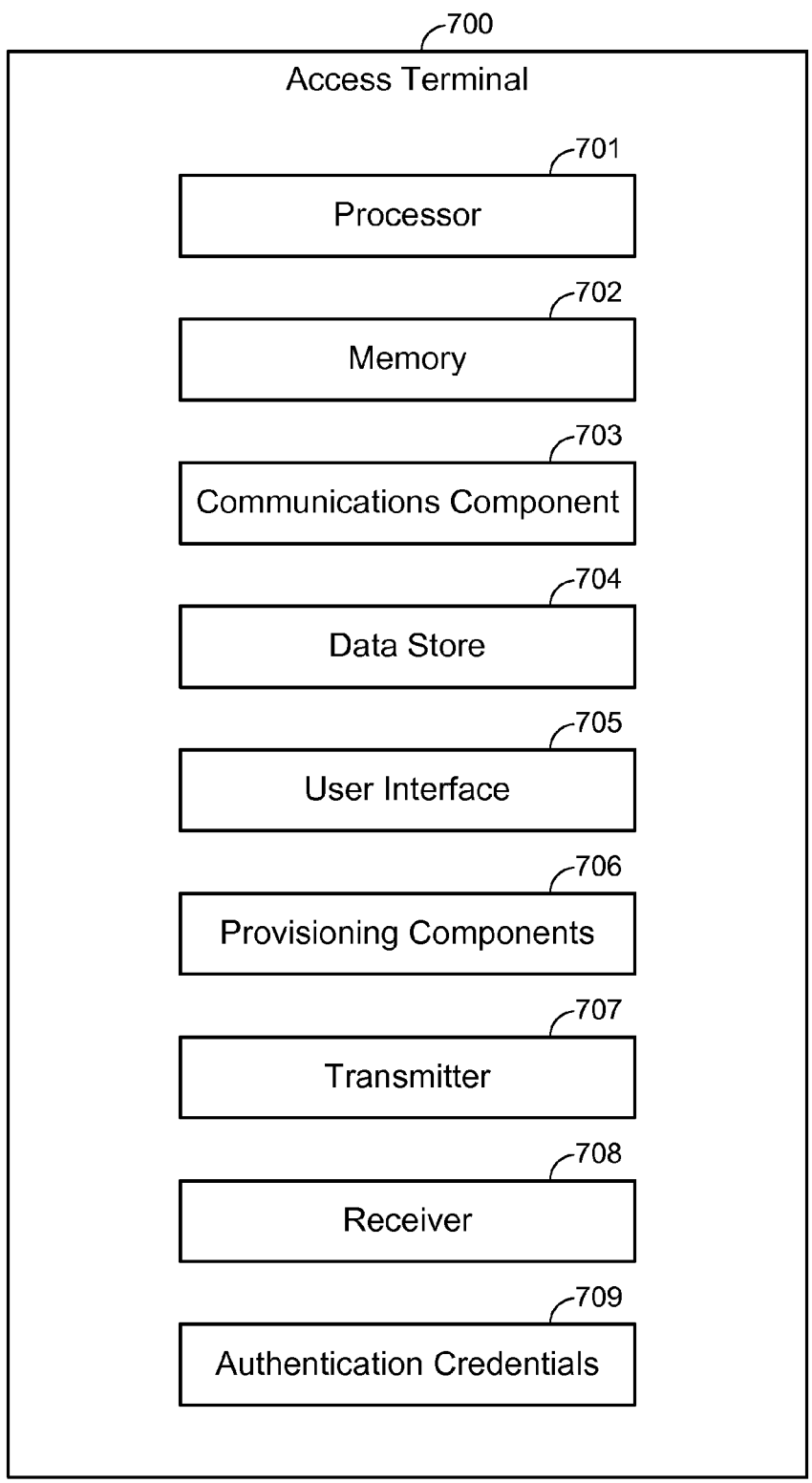
FIG. 7 illustrates a computer device for receiving OTA provisioning of authentication credentials for one access system via another access system.

Referring to FIG. 7, in one aspect, the access terminal, also referred to herein as an access device (AD), user equipment (UE), or mobile station (MS), described above may be represented by computer device 700. Access device 700 includes a processor 701 for carrying out processing functions associated with one or more of components and functions described herein. Processor 701 can include a single or multiple set of processors or multi-core processors. Moreover, processor 701 can be implemented as an integrated processing system and/or a distributed processing system.

Access device 700 further includes a memory 702, such as for storing local versions of applications being executed by processor 701. Memory 702 can include ay type of memory usable by a computer, such as random access memory (RAM), read only memory (ROM), tapes, magnetic discs, optical discs, volatile memory, non-volatile memory, and any combination thereof.

Further, Access device 700 includes a communications component 703 that provides for establishing and maintaining communications with one or more parties utilizing hardware, software, and services as described herein. Communications component 703 may carry communications between components on Access device 700, as well as between Access device 700 and external devices, such as devices located across a communications network and/or devices serially or locally connected to Access device 700. For example, communications component 703 may include one or more buses, and may further include transmit chain components and receive chain components associated with a transmitter and receiver, respectively, operable for interfacing with external devices.

Additionally, Access device 700 may further include a data store 704, which can be any suitable combination of hardware and/or software, that provides for mass storage of information, databases, and programs employed in connection with aspects described herein. For example, data store 704 may be a data repository for applications not currently being executed by processor 701.

Access device 700 may additionally include a user interface component 705 operable to receive inputs from a user of Access device 700, and further operable to generate outputs for presentation to the user. User interface component 705 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 705 may include one or more output devices, including but not limited to a display, a speaker, a haptic feedback mechanism, a printer, any other mechanism capable of presenting an output to a user, or any combination thereof.

Access device 700 may additionally include OTA provisioning components 706 that enable OTA provisioning of authentication credentials via a first access system, wherein the authentication credentials are for a second access system. For example, OTA provisioning components 706 may include one or any combination of hardware, software, firmware, logic, or computer-executable instructions for performing the procedures described above in FIGS. 1-4.

Access device 700 may additionally include a transmitter 707 and receiver 708 for transmitting a call origination or request for over-the-air provisioning of authentication credentials, and for receiving such communication and provisioning.

Access device 700 may additionally include an authentication credentials component 709 that is capable of being provisioned in an over-the-air manner via an access system.

Figure 8:
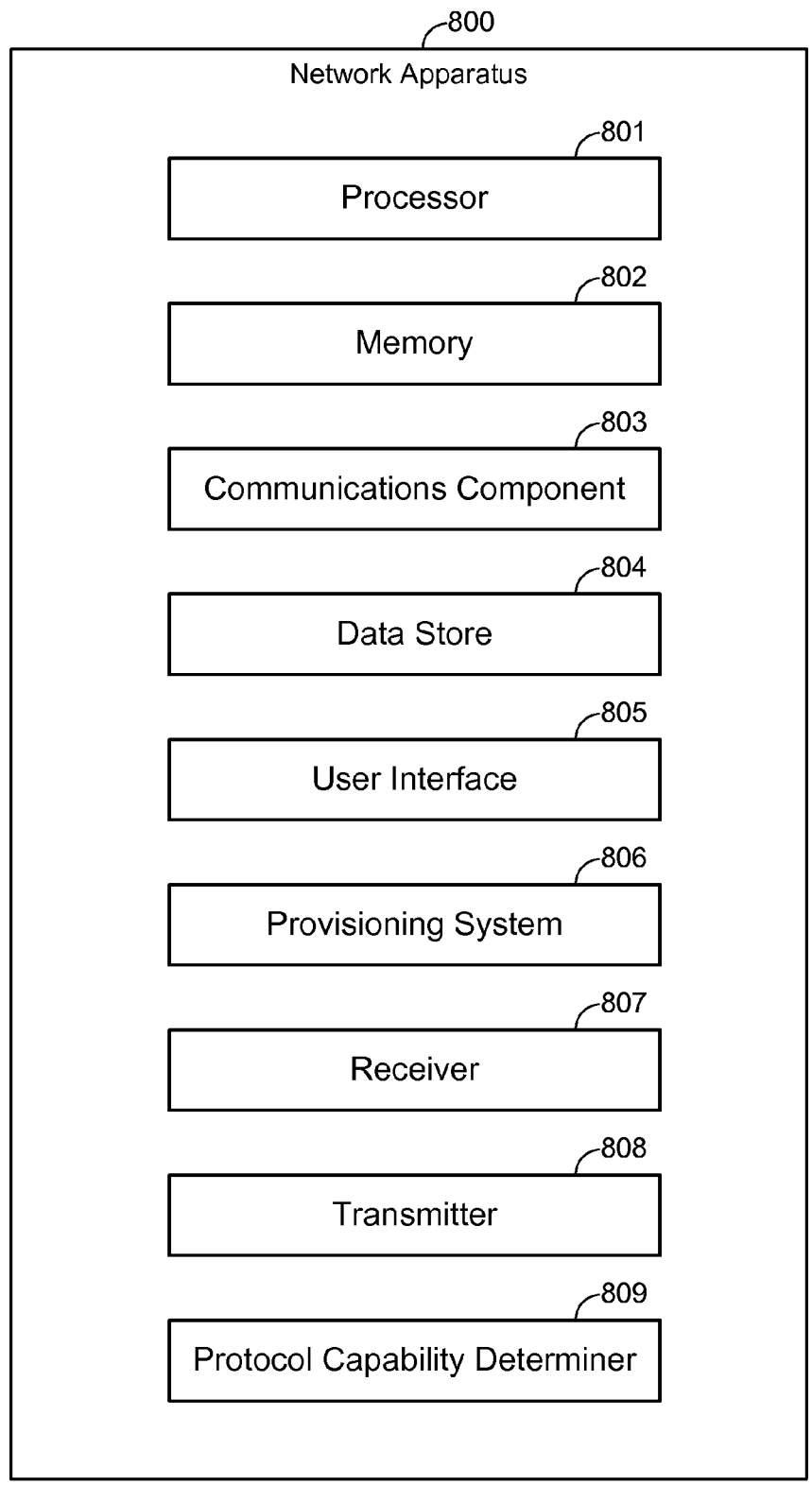
FIG. 8 illustrates a computer device for performing OTA provisioning of authentication credentials for one access system via another access system.

FIG. 8 illustrates aspects of an exemplary network apparatus for provisioning authentication credentials at a MS for a second access system that lack over-the-air provisioning. The network apparatus in FIG. 8 is illustrated by computer device 800. Network apparatus 800 includes a processor 801 for carrying out processing functions associated with one or more of components and functions described herein. Processor 801 can include a single or multiple set of processors or multi-core processors. Moreover, processor 801 can be implemented as an integrated processing system and/or a distributed processing system.

Network apparatus 800 further includes a memory 802, such as for storing local versions of applications being executed by processor 801. Memory 802 can include ay type of memory usable by a computer, such as random access memory (RAM), read only memory (ROM), tapes, magnetic discs, optical discs, volatile memory, non-volatile memory, and any combination thereof.

Further, network apparatus 800 includes a communications component 803 that provides for establishing and maintaining communications with one or more parties utilizing hardware, software, and services as described herein. Communications component 803 may carry communications between components on network apparatus 800, as well as between network apparatus 800 and external devices, such as devices located across a communications network and/or devices serially or locally connected to network apparatus 800. For example, communications component 803 may include one or more buses, and may further include transmit chain components and receive chain components associated with a transmitter and receiver, respectively, operable for interfacing with external devices.

Additionally, network apparatus 800 may further include a data store 804, which can be any suitable combination of hardware and/or software, that provides for mass storage of information, databases, and programs employed in connection with aspects described herein. For example, data store 804 may be a data repository for applications not currently being executed by processor 801.

Network apparatus 800 may additionally include a user interface component 805 operable to receive inputs from a user of network apparatus 800, and further operable to generate outputs for presentation to the user. User interface component 805 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 805 may include one or more output devices, including but not limited to a display, a speaker, a haptic feedback mechanism, a printer, any other mechanism capable of presenting an output to a user, or any combination thereof.

Network apparatus 800 may additionally include OTA provisioning system 806 configured to perform OTA provisioning of authentication credentials at a MS, wherein the authentication credentials are for a second access system. For example, OTA provisioning system 806 may include one or any combination of hardware, software, firmware, logic, or computer-executable instructions for performing the procedures described above in FIGS. 1-4.

Network apparatus 800 may additionally include a protocol capability determiner for determining the protocol capability of a MS that is requesting OTA provisioning. This allows the provisioning system to perform appropriate provisioning of the authentication credentials at the MS.

Network apparatus 800 may further include a receiver 807 and a transmitter 808 for receiving communication from the MS and for sending communication to the MS, as well as for transmitting information for performing OTA provisioning of the authentication credentials at the MS.

Figure 9:
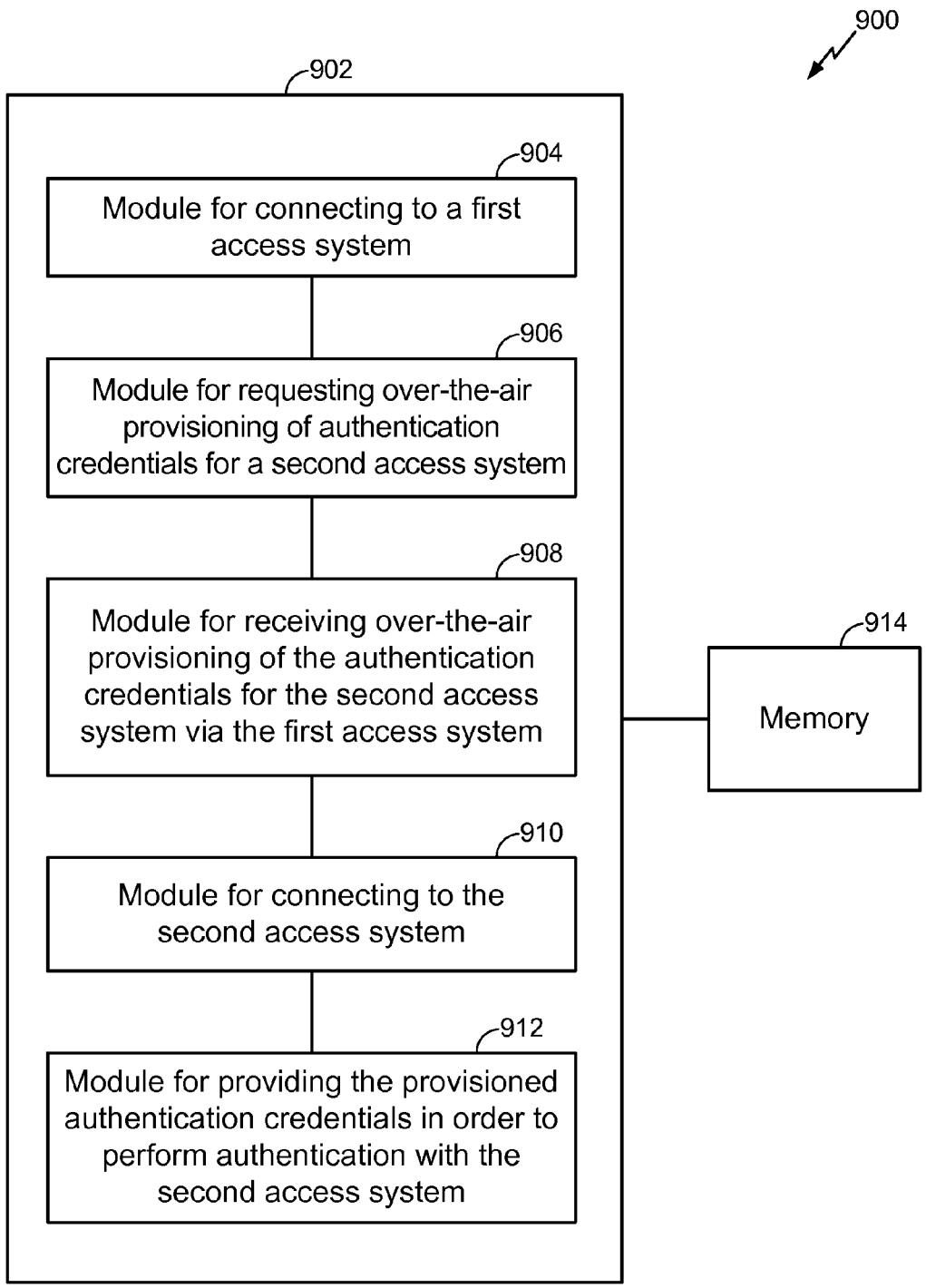
FIG. 9 illustrates a system that receives OTA provisioning of authentication credentials for an access system from another access system.

With reference to FIG. 9, in another aspect, illustrated is a system 900 that receives OTA provisioning of authentication credentials for an access system from another access system. For example, system 900 can reside at least partially within a computer device, mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include a module for connecting to a first access system 904. The first access system may be, for example a CDMA2000 system, such as OTASP or IOTA.

Further, logical grouping 902 can comprise a module for requesting over-the-air provisioning of authentication credentials for a second access system 906. The second access system may be a 3GPP system using AKA authentication methods Furthermore, logical grouping 902 can comprise a module for receiving over-the-air provisioning of the authentication credentials for a second access system 908. Over-the-air provisioning of the authentication credentials for the second access system may include a Diffie-Hellman key agreement or exchanging a password authentication Diffie-Hellman key. The authentication credentials that are provisioned may include any of a 3GPP AKA authentication root key (K), AKA authentication related parameters, and an AKA authentication algorithm to be used in the authentication with the second access system. AKA authentication related parameters may include at least one of whether to use f5 for SQN concealment and the configuration of one or more SQN numbers for AKA SQN management. Receiving over-the-air provisioned authentication credentials may further include receiving over-the-air customization of an AKA authentication algorithm from the first access system. For example, the AKA authentication algorithm may be MILENAGE, and the customization of the authentication algorithm may include customization of an OP or an OPc parameter.

Logical grouping 902 may further module for connecting to the second access system 910 and a module for providing the provisioned authentication credentials in order to perform authentication with the second system 912.

Additionally, system 900 can include a memory 914 that retains instructions for executing functions associated with electrical components 904, 906, 908, 910, and 912. While shown as being external to memory 914, it is to be understood that one or more of electrical components 904, 906, 908, 910, and 912 can exist within memory 914.

Figure 10:
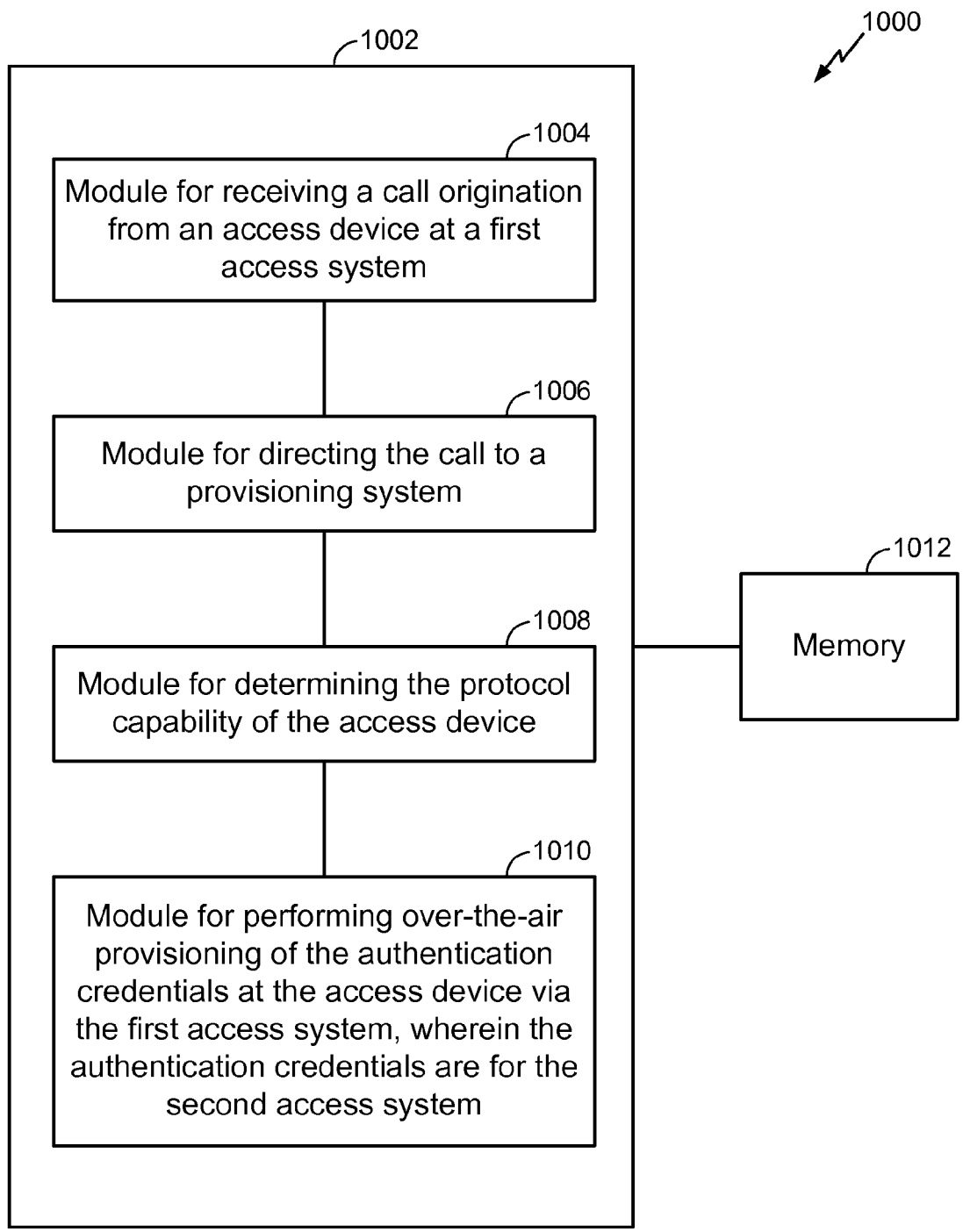
FIG. 10 illustrates system that performs OTA provisioning of the authentication credentials at an access device for another access system.

With reference to FIG. 10, illustrated is a system 1000 that performs OTA provisioning of the authentication credentials at an access device for another access system. For example, system 1000 can reside at least partially within a computer device, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include a module for receiving a call origination from an access device at a first access system 1004. The first access system may be, for example a CDMA2000 system, such as OTASP or IOTA.

Further, logical grouping 1002 can comprise a module for directing the call to a provisioning system 1006.

Furthermore, logical grouping 1002 can comprise a module for determining the protocol capability of the access device 1008.

Logical grouping 1002 may further module for performing over-the-air provisioning of the authentication credentials at the access device via the first access system, wherein the authentication credentials are for the second access system 1010.

The second access system may be a 3GPP system using AKA authentication methods. Over-the-air provisioning of the authentication credentials for the second access system may include a Diffie-Hellman key agreement or a password authenticated Diffie-Hellman key agreement. The authentication credentials that are provisioned may include any of a 3GPP AKA authentication root key (K), AKA authentication related parameters, and an AKA authentication algorithm to be used in the authentication with the second access system. AKA authentication related parameters may include at least one of whether to use f5 for SQN concealment and the configuration of one or more SQN numbers for AKA SQN management. Receiving over-the-air provisioned authentication credentials may further include receiving over-the-air customization of an AKA authentication algorithm from the first access system. For example, the AKA authentication algorithm may be MILENAGE, and the customization of the authentication algorithm may include customization of an OP or an OPc parameter.

Additionally, system 1000 can include a memory 1012 that retains instructions for executing functions associated with electrical components 1004, 1006, 1008, and 1010. While shown as being external to memory 1012, it is to be understood that one or more of electrical components 1004, 1006, 1008, and 1010 can exist within memory 1012.

Abbreviations And Tables

The following abbreviations apply to the exemplary implementations described herein.

3GPD—Third Generation Packet Data

Access Authentication—A procedure in which the Access Terminal (AT) is authenticated by the AN-AAA (Access Network Authentication, Authorization and Accounting entity).

A-key—A secret, 64-bit pattern stored in the mobile station and HLR/AC. It is used to generate/update the mobile station's Shared Secret Data and to validate SPASM.

Authentication—A procedure used by a base station to validate a mobile station's identity.

Authentication Center (AC)—An entity that manages the authentication information related to the mobile station.

Base Station—A fixed station used for communicating with mobile stations. Depending upon the context, the term base station may refer to a cell, a sector within a cell, an MSC, an OTAF, or other part of the wireless system. (See also MSC and OTAF.)

eHRPD Root Key: A secret 128-bit pattern shared between the eHRPD mobile station and the Evolved Packet Core (EPC) network Electronic Serial Number (ESN)—A 32-bit number assigned by the mobile station manufacturer, uniquely identifying the mobile station equipment.

Forward CDMA Channel—A CDMA Channel from a base station to mobile stations. The Forward CDMA Channel contains one or more code channels that are transmitted on a CDMA frequency assignment using a particular pilot PN offset.

Forward Traffic Channel—A code channel used to transport user and signaling traffic from the base station to the mobile station.

Home Location Register (HLR)—The location register to which a MIN/IMSI is assigned for record purposes such as subscriber information.

HRPD—High Rate Packet Data.

IMPU—IMS Public Identity.

International Mobile Station Identity (IMSI)—A method of identifying stations in the land mobile service as specified in ITU-T Recommendation E.212.

ICCID (Integrated Circuit Card Identifier)/UIMID (User Identity Module Identifier)—A globally unique number identifying the smartcard.

Mobile Equipment Identifier (MEID)/IMEI (International Mobile Equipment Identity)—A 56-bit number assigned by the mobile station manufacturer, uniquely identifying the mobile station equipment.

Mobile Station—A station, or access device, fixed or mobile, which serves as the end user's wireless communication link with the base station. Mobile stations include portable units (e.g., hand-held personal units) and units installed in vehicles.

Mobile Switching Center (MSC)—A configuration of equipment that provides wireless radiotelephone service. Also called the Mobile Telephone Switching Office (MTSO).

Network—A network is a subset of a wireless system, such as an area-wide wireless network, a private group of base stations, or a group of base stations set up to handle a special requirement. A network can be as small or as large as needed, as long as it is fully contained within a system. See also System.

Network Identification (NID)—A number that uniquely identifies a network within a wireless system. See also System Identification.

Number Assignment Module (NAM)—A set of MIN/IMSI-related parameters stored in the mobile station.

Over-the-Air Service Provisioning Function (OTAF)—A configuration of network equipment that controls OTASP functionality and messaging protocol.

Over-the-Air Parameter Administration (OTAPA)—Network initiated OTASP process of provisioning mobile station operational parameters over the air interface.

Over-the-Air Service Provisioning (OTASP)—A process of provisioning mobile station operational parameters over the air interface.

P-CSCF—Proxy Call Session Control Function.

Preferred User Zone List (PUZL)—A list that provides the mobile station with the information for the User Zones to which the mobile user is subscribed.

PDSN—Packet Data Service Node.

Secure Mode—Network initiated mode of communicating operational parameters between a mobile station and network based provisioning entity in an encrypted form.

SIP—Session Initiation Protocol.

Service Programming Lock (SPL)—A protection provided for preventing the over-the-air provisioning of certain mobile station parameters by unauthorized network entity by way of verifying the Service Programming Code (SPC).

Subscriber Parameter Administration Security Mechanism (SPASM)—Security mechanism protecting parameters and indicators of active NAM from programming by an unauthorized network entity during the OTAPA session.

System Identification (SID)—A number uniquely identifying a wireless system.

System Selection for Preferred Roaming (SSPR)—A feature that enhances the mobile station system acquisition process based on the set of additional parameters stored in the mobile station in the form of a Preferred Roaming List (PR_LISTs-p).

Traffic Channel—A communication path between a mobile station and a base station used for user and signaling traffic. The term Traffic Channel implies a Forward Traffic Channel and Reverse Traffic Channel pair. See also Forward Traffic Channel and Reverse Traffic Channel.

UMB—Ultra Mobile Broadband.

Numeric information is used to describe the operation of the mobile station. The following subscripts are used to clarify the use of the numeric information: "s" indicates a value stored in a mobile station's temporary memory, "r" indicates a value received by a mobile station over a forward analog control channel or a CDMA Forward Channel, "p" indicates a value set in a mobile station's permanent security and identification memory, and "s-p" indicates a value stored in a mobile station's semi-permanent security and identification memory.

This following define numeric information specifically related to the OTASP.

A_KEY_P_REVp—Protocol revision of the mobile station Key Exchange procedure.

A_KEY_TEMPs—A secret 64-bit pattern temporarily stored in the mobile station.

AUTH_OTAPAs—The computed 18-bit result AUTH_SIGNATURE used for validating SPASM.

BCMCS_Kp—A secret 128-bit pattern permanently stored in the mobile station.

BS_PARAM—A variable used in the base station procedure for 3G Root Key computation.

BS_PW—A 128-bit user password that is stored in the base station. It has the same value as the MS_PW.

BS_PW_HASH—The computed 1152-bit hash of the base station user password BS_PW.

BS_RESULT—Base station result eHRPD_Kp—A secret 128-bit pattern permanently stored in the mobile station eHRPD_K_TEMPs—A secret 128-bit pattern temporarily stored in the mobile station.

G—Generator for Diffie-Hellman key agreement procedure

IMS_Kp—A secret 128-bit pattern permanently stored in the mobile station.

ITM_KEY—An intermediate key used in the procedure for calculating service keys.

MS_PARAM—A variable used in the mobile station procedure for 3G Root Key computation.

MS_PW—A 128-bit user password that is stored in the mobile station. It has the same value as the BS_PW.

MS_PW_HASH—The computed 1152-bit hash of the mobile station user password MS_PW.

MS_RESULT—Mobile station result

NAM_LOCKp—The locking indicator set in the mobile station by the base station that defines SPASM protection of the programmable parameters in the active NAM during the OTAPA session.

NULL—A value that is not in the specified range of the field or variable.

NAM_LOCKs—A network controlled status of the SPASM protection of the active NAM for the subsequent OTAPA session.

NAM_LOCK_STATE—a locking state of the mobile station programmable parameters for OTAPA. If the NAM_LOCK_STATE='1', the parameters are locked for network initiated programming.

P—Prime number for Diffie-Hellman key agreement procedure

PARAM_G—Key exchange parameter G.

PARAM_Gs—Key exchange parameter G.

PARAM_P—Key exchange parameter P.

PARAM_Ps—Key exchange parameter P.

PR_LISTs-p—Preferred Roaming List. Contains information to assist the mobile station system selection and acquisition process. Retained by the mobile station when the power is turned off.

PRL_BLOCK_ID_CURRENTs—Parameter Block Identifier for the current Preferred Roaming List temporarily stored in the mobile station.

PUZLs-p—Preferred User Zone List. Contains information to assist the mobile station during user zone selection and acquisition process. Retained by the mobile station when the power is turned off.

PUZL_P_REVp—Protocol revision of the mobile station PUZL Download procedure.

RAND_SEED—A secret 128-bit pattern temporarily stored in the mobile station.

RKp—A secret 128-bit pattern permanently stored in the mobile station.

RK_TEMPs—A secret 128-bit pattern temporarily stored in the mobile station.

SPCp—Service Programming Code. A secret code assigned to the mobile station and known to the authorized network entity. The base station uses the code equal to the SPCp for unlocking the mobile station parameters for programming or reprogramming.

SPCs—Service Programming Code temporarily stored in the mobile station.

SPL_P_REVp—Protocol revision of the mobile station Service Programming Lock.

SP_LOCK_STATE—A locking state of the mobile station programmable parameters. If the SP_LOCK_STATE='1', the parameters are locked for programming.

SSPR_P_REVp—Protocol revision of the mobile station SSPR Download procedure and the PRL format.

SECURE_MODE_IND$_S$—Secure Mode indicator. If SECURE_MODE IND$_S$='1', current programming session is in Secure Mode.

WLAN_Kp—A secret 128-bit pattern permanently stored in the mobile station.

X—Random number generated by mobile station

Y—Random number generated by base station

Additional description of OTA Service Provisioning of mobile stations can be found in C.S.0016-D v1.0 at http://www.3gpp2.org/Public_html/specs/C.S0016-D%20v1.0_OTASP.pdf, the 3GPP2 website, the entire contents of which are hereby incorporated by reference.

The following subscripts are used to clarify number information that is used to describe the operation of the mobile station: "s" indicates a value stored in a mobile station's temporary memory, "r" indicates a value received by a mobile station over a forward analog channel or a CDMA Forward Channel, "p" indicates a value set in a mobile station's permanent security and identification memory, and "s-p" indicates a value stored in a mobile station's semi-permanent security and identification memory.

Each mobile station is assigned either a single unique 32-bit binary serial number (ESN) or a single unique 56-bit binary serial number (MEID) that cannot be changed by the subscriber without rendering the mobile station inoperative.

Table 3.5.1.7-1 includes Feature Identifier information:

TABLE 3.5.1.7-1

| Features | FEATURE_ID | FEATURE_P_REV | FEATURE_P_REV Description |
|---|---|---|---|
| NAM Download (DATA_P_REV) | '00000000' | '00000010' | NAM Download as specified in this document |
| Key Exchange (A_KEY_P_REV) | '00000001' | '00000010' | A key provisioning as specified in this document |
| | | '00000011' | A key and 3G Root Key provisioning as specified in this document |
| | | '00000100' | 3G Root Key provisioning as specified in this document |
| | | '00000101' | Enhanced 3G Root Key provisioning as specified in this document |
| | | '00000110' | Service Key Generation as specified in this document |
| | | '00000111' | eHRPD Root Key provisioning as specified in this document |
| | | '00001000' | Enhanced eHRPD Root Key provisioning as specified in this document |
| System Selection for Preferred Roaming (SSPR_P_REV) | '00000010' | '00000001' | System Selection for Preferred Roaming using Preferred Roaming List |
| | | '00000010' | Reserved |
| | | '00000011' | System Selection for Preferred Roaming using Extended Preferred Roaming List associated with SSPR_P_REV of '00000011' |
| Service Programming Lock (SPL_P_REV) | '00000011' | '00000001' | Service Programming Lock as specified in this document |
| Over-The-Air Parameter Administration (OTAPA_P_REV) | '00000100' | '00000001' | Over-The-Air Parameter Administration as specified in this document |

TABLE 3.5.1.7-1-continued

| Features | FEATURE_ID | FEATURE_P_REV | FEATURE_P_REV Description |
|---|---|---|---|
| Preferred User Zone List (PUZL_P_REV) | '00000101' | '00000010' | Preferred User Zone List as specified in this document |
| 3G Packet Data (3GPD) | '00000110' | '00000011' | 3G Packet Data as specified in this document |
| Secure MODE (SECURE_MODE_P_REV) | '00000111' | '00000001' | Secure Mode as specified in this document when root key K is not available |
|  |  | '00000010' | Secure Mode as specified in this document when root key K is available |
| Multimedia Domain (MMD) | '00001000' | '00000001' | MMD as specified in this document |
| System Tag Download (TAG_P_REV) | '00001001' | '00000001' | System Tag Download as specified in this document |
| Multimedia Messaging Service (MMS) | '00001010' | '00000001' | MMS as specified in this document |
| Multimode System Selection (MMSS) | '00001011' | '00000001' | MMSS as specified in this document |
| Reserved for future standardization | '000001100' through '10111111' |  |  |
| Available for manufacturer-specific features | '11000000' through '11111110' | See [4] |  |
| Reserved | '11111111' |  |  |

TABLE 3.5.1.2-1

| Result Codes | |
|---|---|
| RESULT_CODE | Message Parameter Description |
| '00000000' | Accepted - Operation successful |
| '00000001' | Rejected - Unknown reason |
| '00000010' | Rejected - Data size mismatch |
| '00000011' | Rejected - Protocol version mismatch |
| '00000100' | Rejected - Invalid parameter |
| '00000101' | Rejected - SID/NID length mismatch |
| '00000110' | Rejected - Message not expected in this mode |
| '00000111' | Rejected - BLOCK_ID value not supported |
| '00001000' | Rejected - Preferred roaming list length mismatch |
| '00001001' | Rejected - CRC error |
| '00001010' | Rejected - Mobile station locked |
| '00001011' | Rejected - Invalid SPC |
| '00001100' | Rejected - SPC change denied by the user |
| '00001101' | Rejected - Invalid SPASM |
| '00001110' | Rejected - BLOCK_ID not expected in this mode |
| '00001111' | Rejected - User Zone already in PUZL |
| '00010000' | Rejected - User Zone not in PUZL |
| '00010001' | Rejected - No entries in PUZL |
| '00010010' | Rejected - Operation Mode mismatch |
| '00010011' | Rejected - SimpleIP MAX_NUM_NAI mismatch |
| '00010100' | Rejected - SimpleIP MAX_NAI_LENGTH mismatch |
| '00010101' | Rejected - MobileIP MAX_NUM_NAI mismatch |
| '00010110' | Rejected - MobileIP MAX_NAI_LENGTH mismatch |
| '00010111' | Rejected - SimpleIP PAP MAX_SS_LENGTH mismatch |
| '00011000' | Rejected - SmpleIP CHAP MAX_SS_LENGTH mismatch |
| '00011001' | Rejected - MobileIP MAX_MN-AAA_SS_LENGTH mismatch |
| '00011010' | Rejected - MobileIP MAX_MN-HA_SS_LENGTH mismatch |
| '00011011' | Rejected - MobileIP MN-AAA_AUTH_ALGORITHM mismatch |
| '00011100' | Rejected - MobileIP MN-HA_AUTH_ALGORITHM mismatch |
| '00011101' | Rejected - SimpleIP ACT_NAI_ENTRY_INDEX mismatch |
| '00011110' | Rejected - MobileIP ACT_NAI_ENTRY_INDEX mismatch |
| '00011111' | Rejected - SimpleIP PAP NAI_ENTRY_INDEX mismatch |
| '00100000' | Rejected - SimpleIP CHAP NAI_ENTRY_INDEX mismatch |
| '00100001' | Rejected - MobileIP NAI_ENTRY_INDEX mismatch |
| '00100010' | Rejected - Unexpected PRL_BLOCK_ID change |
| '00100011' | Rejected - PRL format mismatch |

TABLE 3.5.1.2-1-continued

Result Codes

| RESULT_CODE | Message Parameter Description |
|---|---|
| '00100100' | Rejected - HRPD Access Authentication MAX_NAI_LENGTH mismatch |
| '00100101' | Rejected - HRPD Access Authentication CHAP MAX_SS_LENGTH mismatch |
| '00100110' | Rejected - MMD MAX_NUM_IMPU mismatch |
| '00100111' | Rejected - MMD MAX_IMPU_LENGTH mismatch |
| '00101000' | Rejected - MMD MAX_NUM_P-CSCF mismatch |
| '00101001' | Rejected - MMD MAX_P-CSCF_LENGTH mismatch |
| '00101010' | Rejected - Unexpected System Tag BLOCK_ID Change |
| '00101011' | Rejected - System Tag Format mismatch |
| '00101100' | Rejected - NUM_MMS_URI mismatch |
| '00101101' | Rejected - MMS_URI_LENGTH mismatch |
| '00101110' | Rejected - Invalid MMS_URI |
| '00101111' | Rejected - MMSS NUM_MLPL_REC mismatch |
| '00110000' | Rejected - MMSS NUM_MSPL_REC mismatch |
| '00110001' | Rejected - MMSS NUM_WLAN_AIR_INT mismatch |
| '00110010'-'01111111' | Reserved for future standardization |
| '10000000'-'11111110' | Available for manufacturer-specific Result Code definitions. See [4]. |
| '11111111' | Reserved |

Table 3.5.8-1 lists the types of parameter blocks used in the 3GPD Configuration Request Message and the 3GPD Configuration Response Message.

TABLE 3.5.8-1

3GPD Parameter Block Types

| Parameter Block Type | BLOCK_ID | Reference |
|---|---|---|
| 3GPD Operation Capability Parameters | '00000000' | 3.5.8.1 |
| 3GPD Operation Mode Parameters | '00000001' | 3.5.8.2 |
| SimpleIP Capability Parameters | '00000010' | 3.5.8.3 |
| MobileIP Capability Parameters | '00000011' | 3.5.8.4 |
| SimpleIP User Profile Parameters | '00000100' | 3.5.8.5 |
| Mobile IP User Profile Parameters | '00000101' | 3.5.8.6 |
| SimpleIP Status Parameters | '00000110' | 3.5.8.7 |
| MobileIP Status Parameters | '00000111' | 3.5.8.8 |
| SimpleIP PAP SS Parameters[1] | '00001000' | 3.5.8.9 |
| SimpleIP CHAP SS Parameters[1] | '00001001' | 3.5.8.10 |
| MobileIP SS Parameters[1] | '00001010' | 3.5.8.11 |
| HRPD Access Authentication Capability Parameters | '00001011' | 3.5.8.12 |
| HRPD Access Authentication User Profile Parameters | '00001100' | 3.5.8.13 |
| HRPD Access Authentication CHAP SS Parameters[1] | '00001101' | 3.5.8.14 |
| eHRPD AKA Algorithm Capability Parameters | 00001110 | 3.5.8.15 |
| eHRPD MILENAGE Algorithm Parameters[2] | 00001111 | 3.8.5.16 |
| Reserved | '000010000' through '11111111' | |

[1]The shared secret parameters shall not be transmitted over the air unencrypted.
[2]The MILENAGE algorithm parameters shall not be transmitted over the air unencrypted.

3GPD Parameter Blocks-Table 4.5.7-1

The following table, Table 4.5.7-1, lists the types of parameter blocks used in the 3GPD Download Request Message and the 3GPD Download Response Message.

TABLE 4.5.7-1

3GPD Parameter Block Types

| Parameter Block Type | BLOCK_ID | Reference |
|---|---|---|
| 3GPD Operation Mode Parameters | '00000000' | 4.5.7.1 |
| SimpleIP User Profile Parameters | '00000001' | 4.5.7.2 |
| Mobile IP User Profile Parameters | '00000010' | 4.5.7.3 |
| SimpleIP Status Parameters | '00000110' | 4.5.7.4 |
| MobileIP Status Parameters | '00000111' | 4.5.7.5 |
| SimpleIP PAP SS Parameters[1] | '00001000' | 4.5.7.6 |
| SimpleIP CHAP SS Parameters[1] | '00001001' | 4.5.7.7 |
| MobileIP SS Parameters[1] | '00001010' | 4.5.7.8 |
| HRPD Access Authentication User Profile Parameters | '00001011' | 4.5.7.9 |
| HRPD Access Authentication CHAP SS Parameters[1] | '00001100' | 4.5.7.10 |
| eHRPD MILENAGE Algorithm Parameters[2] | 00001101 | 4.5.7.11 |
| Reserved | '00001110' through '11111111' | |

[1]The shared secret parameters shall not be transmitted over the air unencrypted.
[2]The MILENAGE algorithm parameters shall not be transmitted over the air unencrypted.

5.2.1 Generation of the Key Exchange Parameters. The base station shall select and store a 512-bit prime number P based on the following criteria:
   P should be chosen randomly.
   (P−1) should have a large prime factor.
   The most significant bit of P should be equal to '1'.
   The base station shall set PARAM_P of the MS Key Request Message to P. The base station shall select a 160-bit number G such that it is greater than 1 and less than (P−1). The base station shall set PARAM_G of the MS Key Request Message to G. The base station shall generate a random number Y for use in calculating the base station result, BS_RESULT. The number Y shall have the following properties:
   The number generated shall be 160-bits in length.
   The number generated shall not be less than 4.
   The number generated shall have a uniform statistical distribution over its range.
   The numbers used in formulating different Key Generation Request Messages sent by the same base station shall be statistically uncorrelated.
   The numbers used in formulating Key Generation Request Message sent by different base stations shall be statistically uncorrelated.

5.3.1 Random Number Generation for Diffie-Hellman Key Agreement Procedure. The mobile station shall set PARAM_$P_S$ for use in calculating the mobile station result, MS_RESULT, to the following 1024-bit prime number (Most Significant Bit first):
0xFFFFFFFF 0xFFFFFFFF 0xC90FDAA2 0x2168C234 0xC4C6628B 0x80DC1CD1 0x29024E08 0x8A67CC74 0x020BBEA6 0x3B139B22 0x514A0879 0x8E3404DD 0xEF9519B3 0xCD3A431B 0x302B0A6D 0xF25F1437 0x4FE1356D 0x6D51C245 0xE485B576 0x625E7EC6 0xF44C42E9 0xA637ED6B 0x0BFF5CB6 0xF406B7ED 0xEE386BFB 0x5A899FA5 0xAE9F2411 0x7C4B1FE6 0x49286651 0xECE65381 0xFFFFFFFF 0xFFFFFFFF The mobile station shall set PARAM_$G_S$ for use in calculating MS_RESULT to '00000010'.

The mobile station shall generate a random number X for use in calculating MS_RESULT. The number X shall have the following properties:

The number generated shall be 256-bits in length.
The number generated shall not be less than 4.
The number generated shall have a uniform statistical distribution over its range.
The numbers used in formulating different Key Generation Response Messages sent by the same mobile station shall be statistically uncorrelated.
The number used in formulating each Key Generation Response Message shall not be derivable from the previously used numbers or mobile station indicator values.
The numbers used in formulating Key Generation Response Messages sent by different mobile stations shall be statistically uncorrelated The number used above may be part of the OAKLEY IETF standard. However, any suitable prime number may also be used.

5.3.3 A Key and Root Key Computation for A_KEY_P_REV='00000011'

The mobile station shall compute one of the input to $f0$, Random Secret Seed, RAND_SEED_TEMP=BS_RESULT$_S^X$ modulo PARAM_$P_S$. The mobile station shall store the least significant 128 bits of the result RAND_SEED_TEMP as RAND_SEED.

The A_KEY and 3G Root Key RK are generated by invoking the algorithmic function $f0$ as specified in Section 2.2.2.2 of [8]. Since each invocation of $f0$ produces 64 bits, three invocation of $f0$ is need for a total of 192 bits.

The input parameters to the algorithmic function $f0$ shall be set as follows:

The K parameter shall be set to RAND_SEED.
The fi parameter shall be set to 0x41.
The Fmk parameter shall be set to 0x41484147.
The mobile station shall invoke $f0$.
The mobile station shall store the most significant bits of the result of invocation of $f0$ as the A_KEY_TEMP$_S$.
The mobile station shall store the remaining 128 bits of the invocation of $f0$ as RK_TEMP$_S$.

5.4.1 Generation of the Key Exchange Parameters Root Key. This relates to the Base Station Requirements for A_KEY_P_REV='00000011' or '00000100'. The base station shall set PARAM_$P_S$ for use in calculating the base station result, BS_RESULT, to the following 1024-bit prime number (Most Significant Bit first):
0xFFFFFFFF 0xFFFFFFFF 0xC90FDAA2 0x2168C234 0xC4C6628B 0x80DC1CD1 0x29024E08 0x8A67CC74 0x020BBEA6 0x3B139B22 0x514A0879 0x8E3404DD 0xEF9519B3 0xCD3A431B 0x302B0A6D 0xF25F1437 0x4FE1356D 0x6D51C245 0xE485B576 0x625E7EC6 0xF44C42E9 0xA637ED6B 0x0BFF5CB6 0xF406B7ED 0xEE386BFB 0x5A899FA5 0xAE9F2411 0x7C4B1FE6 0x49286651 0xECE65381 0xFFFFFFFF 0xFFFFFFFF The base station shall set PARAM_$G_S$ for use in calculating BS_RESULT to '00000010'.

The base station shall generate a random number Y for use in calculating BS_RESULT. The number Y shall have the following properties:

The number generated shall be 256-bits in length.
The number generated shall not be less than 4.
The number generated shall have a uniform statistical distribution over its range.
The numbers used in formulating different Key Generation Request Messages sent by the same base station shall be statistically uncorrelated.
The numbers used in formulating Key Generation Request Message sent by different base stations shall be statistically uncorrelated.

5.5 Mobile Station Requirements for A_KEY_P_REV='00000101'

5.5.1 Random Number Generation and Key Generation Parameters

The mobile station shall set PARAM_$P_S$ for use in calculating the mobile station result, MS_RESULT, to the 1024-bit prime number as specified in 5.3.1.

The mobile station shall set PARAM_$G_S$ for use in calculating MS_RESULT to '00001101'.

The mobile station shall generate a random number X for use in calculating MS_RESULT. The number X shall have the following properties:

The number generated shall be 384-bits in length.
The number generated shall not be less than 4.
The number generated shall have a uniform statistical distribution over its range.
The numbers used in formulating different Key Generation Response Messages sent by the same mobile station shall be statistically uncorrelated.
The number used in formulating each Key Generation Response Message shall not be derivable from the previously used numbers or mobile station indicator values.
The numbers used in formulating Key Generation Response Messages sent by different mobile stations shall be statistically uncorrelated.

5.5.2 Mobile Station Result

The mobile station shall calculate MS_PW_HASH as the follows:

MS_PW_HASH=SHA-1 (0x00000001,0x00000001, MS_PW) modulo $2^{128}$|
   SHA-1 (0x00000001,0x00000002, MS_PW) modulo $2^{128}$|
   SHA-1 (0x00000001,0x00000003, MS_PW) modulo $2^{128}$|
   SHA-1 (0x00000001,0x00000004, MS_PW) modulo $2^{128}$|
   SHA-1 (0x00000001,0x00000005, MS_PW) modulo $2^{128}$|
   SHA-1 (0x00000001,0x00000006, MS_PW) modulo $2^{128}$|
   SHA-1 (0x00000001,0x00000007, MS_PW) modulo $2^{128}$|
   SHA-1 (0x00000001,0x00000008, MS_PW) modulo $2^{128}$|
   SHA-1 (0x00000001,0x00000009, MS_PW) modulo $2^{128}$.

The mobile station shall calculate MS_RESULT= (MS_PW_HASH*PARAM_$G_S^X$) modulo PARAM_$P_S$. MS_PW_HASH may be reduced modulo PARAM_$P_S$ prior to multiplication to simplify implementation. SHA-1 refers to the FIPS-180 hash function as specified in C.S0024-A, "*cdma2000 High Rate Packet Data Air Interface Specification*", April 2004.

5.5.3 Root Key Computation for A_KEY_P_REV='00000101'

The mobile station shall compute the Root Key RK=SHA-1 (0x00000003|0x00000C80 (This value is set to the length of MS_PARAM in bits.)|MS_PARAM|MS_PARAM), where MS_PARAM=MS_PW|

PARAM_$G_S^X$ modulo PARAM_$P_s$|
(BS_RESULT$_S$/BS_PW_HASH) modulo PARAM_$P_s$|
((BS_RESULT$_S$/BS_PW_HASH)$^X$) modulo PARAM_$P_s$P.

The mobile station shall store the least significant 128 bits of the result RK as RK_TEMP$_S$.

5.6 Base Station Requirements for A_KEY_P_REV='00000101'

5.6.1 Random Number Generation and Key Generation Parameters

The base station shall set PARAM_$P_S$ for use in calculating the base station result, BS_RESULT, to the following 1024-bit prime number (Most Significant Bit first) as specified in 5.4.1.

The base station shall set PARAM_$G_S$ for use in calculating BS_RESULT to '00001101'.

The base station shall generate a random number Y for use in calculating BS_RESULT. The number Y shall have the following properties:

The number generated shall be 384-bits in length.
The number generated shall not be less than 4.
The number generated shall have a uniform statistical distribution over its range.
The numbers used in formulating different Key Generation Request Messages sent by the same base station shall be statistically uncorrelated.
The numbers used in formulating Key Generation Request Message sent by different base stations shall be statistically uncorrelated.

5.6.2 Base Station Result

The base station shall calculate BS_PW_HASH where
BS_PW_HASH=SHA-1 (0x00000002,0x00000001, BS_PW) modulo $2^{128}$|
SHA-1 (0x00000002,0x00000002, BS_PW) modulo $2^{128}$|
SHA-1 (0x00000002,0x00000003, BS_PW) modulo $2^{128}$|
SHA-1 (0x00000002,0x00000004, BS_PW) modulo $2^{128}$|
SHA-1 (0x00000002,0x00000005, BS_PW) modulo $2^{128}$|
SHA-1 (0x00000002,0x00000006, BS_PW) modulo $2^{128}$|
SHA-1 (0x00000002,0x00000007, BS_PW) modulo $2^{128}$|
SHA-1 (0x00000002,0x00000008, BS_PW) modulo $2^{128}$|
SHA-1 (0x00000002,0x00000009, BS_PW) modulo $2^{128}$.

The base station shall calculate BS_RESULT=(BS_PW HASH*PARAM_$G^Y$) modulo PARAM_P. BS_PW_HASH may be reduced modulo P prior to multiplication to simplify implementation.

In the above description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for over-the-air provisioning, comprising:
   connecting to a first access system;
   requesting over-the-air provisioning of authentication credentials for a second access system, wherein the second access system lacks any over-the-air provisioning procedure;
   receiving over-the-air provisioning of the authentication credentials for the second access system via the first access system;
   connecting to the second access system; and
   providing the provisioned authentication credentials to the second access system, in order to perform authentication with the second access system.

2. The method according to claim 1, wherein the authentication credentials include Authentication and Key Agreement (AKA) authentication credentials, the method further comprising:
   performing AKA authentication with the second access system using the AKA authentication credentials.

3. A method for over-the-air provisioning, comprising:
   connecting to a first access system;
   requesting over-the-air provisioning of authentication credentials for a second access system, wherein the second access system lacks an over-the-air provisioning procedure;

receiving over-the-air provisioning of the authentication credentials for the second access system via the first access system;

connecting to the second access system; and providing the provisioned authentication credentials to the second access system, in order to perform authentication with the second access system, wherein the second access system comprises a 3GPP core network and the first access system is a non-3GPP core network.

4. The method according to claim 3, wherein the over-the-air provisioning includes establishing a key using a Diffie-Hellman based protocol.

5. The method according to claim 3, wherein the over-the-air provisioning includes exchanging a password authentication key using a Diffie-Hellman protocol.

6. The method according to claim 3, wherein the over-the-air provisioned authentication credentials include at least one of a 3GPP AKA authentication root key (K), AKA authentication related parameters, or an AKA authentication algorithm to be used in the authentication with the second access system.

7. The method according to claim 6, wherein the over-the-air provisioned authentication credentials include AKA authentication related parameters, and wherein the AKA authentication related parameters include at least one of whether to use f5 for SQN concealment and the configuration of one or more SQN numbers for AKA SQN management.

8. The method according to claim 6, wherein the over-the-air provisioned authentication credentials include the AKA authentication algorithm to be used in the authentication with the second access system, further comprising:

receiving over-the-air customization of the authentication algorithm from the first access system.

9. The method according to claim 8, wherein the AKA authentication algorithm is MILENAGE, and wherein customization of the authentication algorithm includes customization of an OP or an OPc parameter.

10. The method according to claim 8, wherein the first access system comprises a CDMA2000 system.

11. The method according to claim 10, wherein the over-the-air provisioning is received via Over-the-Air Service Provisioning (OTASP).

12. The method according to claim 10, wherein the over-the-air provisioning is received via Internet-Over-the-Air (IOTA).

13. An apparatus for receiving over-the-air provisioning, the apparatus comprising:

a transmitter for connecting to a first access system and a second access system;

a processor for requesting, from the first access system, over-the-air provisioning of authentication credentials for the second access system, wherein the second access system lacks any over-the-air provisioning procedure;

a receiver for receiving over-the-air provisioning of the authentication credentials for the second access system from the first access system;

memory for storing the received over-the-air provisioning of the authentication credentials for the second access system; and a communications component for providing the provisioned authentication credentials to the second access system, in order to perform authentication with the second access system in order to establish a connection with the second access system.

14. The apparatus according to claim 13, wherein the authentication credentials include Authentication and Key Agreement (AKA) authentication credentials, and wherein the over-the-air provisioning includes performing AKA authentication with the second access system using the AKA authentication credentials.

15. An apparatus for receiving over-the-air provisioning, the apparatus comprising:

a transmitter for connecting to a first access system and a second access system;

a processor for requesting, from the first access system, over-the-air provisioning of authentication credentials for the second access system, wherein the second access system lacks any over-the-air provisioning procedure;

a receiver for receiving over-the-air provisioning of the authentication credentials for the second access system from the first access system;

memory for storing the received over-the-air provisioning of the authentication credentials for the second access system; and a communications component for providing the provisioned authentication credentials to the second access system, in order to perform authentication with the second access system in order to establish a connection with the second access system, wherein the second access system comprises a 3GPP core network and the first access system is a non-3GPP core network.

16. The apparatus according to claim 15, wherein the over-the-air provisioning includes establishing a key using a Diffie-Hellman based protocol.

17. The apparatus according to claim 15, wherein the over-the-air provisioning includes exchanging a password authenticated Diffie-Hellman key agreement.

18. The apparatus according to claim 15, wherein the over-the-air provisioned authentication credentials include at least one of a 3GPP AKA authentication root key (K), AKA authentication related parameters, and an AKA authentication algorithm to be used in the authentication with the second access system.

19. The apparatus according to claim 18, wherein the over-the-air provisioned authentication credentials include AKA authentication related parameters, and wherein the AKA authentication related parameters include at least one of whether to use f5 for SQN concealment and the configuration of one or more SQN numbers for AKA SQN management.

20. The apparatus according to claim 18, wherein the over-the-air provisioned authentication credentials include the AKA authentication algorithm to be used in the authentication with the second access system, and wherein the over-the-air provisioning further includes receiving over-the-air customization of the authentication algorithm from the first access system.

21. The apparatus according to claim 20, wherein the AKA authentication algorithm is MILENAGE, and wherein customization of the authentication algorithm includes customization of an OP or an OPc parameter.

22. The apparatus according to claim 20, wherein the first access system is a CDMA2000 system.

23. The apparatus according to claim 22, wherein the over-the-air provisioning is received via Over-the-Air Service Provisioning (OTASP).

24. The apparatus according to claim 22, wherein the over-the-air provisioning is received via Internet-Over-the-Air (IOTA).

25. An apparatus for receiving over-the-air provisioning, the apparatus comprising:

means for connecting to a first access system and a second access system;

means for requesting over-the-air provisioning of authentication credentials for a second access system, wherein the second access system lacks any over-the-air provisioning procedure;

means for receiving over-the-air provisioning of the authentication credentials for the second access system from the first access system; and means for providing the provisioned authentication credentials to the second access system, in order to perform authentication with the second access system.

26. An apparatus comprising:
at least one processor configured to receive over-the-air provisioning, the processor comprising:
a first module for connecting to a first access system;
a second module for requesting over-the-air provisioning of authentication credentials for the second access system, wherein the second access system lacks any over-the-air provisioning procedure;
a third module for receiving over-the-air provisioning of the authentication credentials for the second access system from the first access system;
a fourth module for connecting to the second access system; and
a fifth module for providing the provisioned authentication credentials to the second access system, in order to perform authentication with the second access system.

27. A computer program product, comprising:
a non-transitory computer-readable medium comprising:
a first set of codes for causing a computer to connect to a first access system;
a second set of codes for causing a computer to request over-the-air provisioning of authentication credentials for the second access system, wherein the second access system lacks any over-the-air provisioning procedure;
a third set of codes for causing a computer to receive over-the-air provisioning of the authentication credentials for the second access system;
a fourth set of codes for causing a computer to connect to the second access system; and
a fifth set of codes for causing a computer to provide the provisioned authentication credentials to the second access system, in order to perform authentication with the second access system.

28. A method for performing over-the-air provisioning, the method comprising:
receiving a call origination from an access device at a first access system;
directing the call to a provisioning system;
determining the protocol capability of the access device; and
performing over-the-air provisioning of authentication credentials at the access device via the first access system, wherein the authentication credentials are for the second access system lacking any over-the-air provisioning procedure.

29. The method according to claim 28, wherein the authentication credentials include Authentication and Key Agreement (AKA) authentication credentials.

30. A method for performing over-the-air provisioning, the method comprising:
receiving a call origination from an access device at a first access system;
directing the call to a provisioning system;
determining the protocol capability of the access device; and
performing over-the-air provisioning of authentication credentials at the access device via the first access system, wherein the authentication credentials are for the second access system lacking an over-the-air provisioning procedure, wherein the second access system comprises a 3GPP core network and the first access system is a non-3GPP core network.

31. The method according to claim 30, wherein performing the over-the-air provisioning includes establishing a key using a Diffie-Hellman based protocol.

32. The method according to claim 30, wherein performing the over-the-air provisioning includes a password authenticated Diffie-Hellman key agreement.

33. The method according to claim 30, wherein the over-the-air provisioned authentication credentials include at least one of a 3GPP AKA authentication root key (K), AKA authentication related parameters, and an AKA authentication algorithm to be used in the authentication with the second access system.

34. The method according to claim 33, wherein the over-the-air provisioned authentication credentials include AKA authentication related parameters, and wherein the AKA authentication related parameters include at least one of whether to use f5 for SQN concealment and the configuration of one or more SQN numbers for AKA SQN management.

35. The method according to claim 33, wherein the over-the-air provisioned authentication credentials include the AKA authentication algorithm to be used in the authentication with the second access system, further comprising:
performing over-the-air customization of the authentication algorithm from the first access system.

36. The method according to claim 35, wherein the AKA authentication algorithm is MILENAGE, and wherein customization of the authentication algorithm includes customization of an OP or an OPc parameter.

37. The method according to claim 35, wherein the first access system is a CDMA2000 system.

38. The method according to claim 37, wherein the over-the-air provisioning is performed via Over-the-Air Service Provisioning (OTASP).

39. The method according to claim 37, wherein the over-the-air provisioning is performed via Internet-Over-the-Air (IOTA).

40. An apparatus for over-the-air provisioning, the apparatus comprising:
a receiver for receiving a call origination from an access device at a first access system;
a processor for directing the call to a provisioning system and for determining the protocol capability of the access device; and
a provisioning system for performing over-the-air provisioning of authentication credentials at the access device via the first access system, wherein the authentication credentials are for the second access system lacking any over-the-air provisioning procedure.

41. The apparatus according to claim 40, wherein the authentication credentials are Authentication and Key Agreement (AKA) authentication credentials.

42. An apparatus for over-the-air provisioning, the apparatus comprising:
a receiver for receiving a call origination from an access device at a first access system;
a processor for directing the call to a provisioning system and for determining the protocol capability of the access device; and a provisioning system for performing over-the-air provisioning of authentication credentials at the access device via the first access system, wherein the authentication credentials are for the second access system lacking an over-the-air provisioning procedure, wherein the second access system comprises a 3GPP core network and the first access system is a non-3GPP core network.

43. The apparatus according to claim 42, wherein performing the over-the-air provisioning includes establishing a key using a Diffie-Hellman based protocol.

44. The apparatus according to claim 42, wherein performing the over-the-air provisioning includes a password authenticated Diffie-Hellman key agreement.

45. The apparatus according to claim 42, wherein the over-the-air provisioned authentication credentials include at least one of a 3GPP AKA authentication root key (K), AKA authentication related parameters, and an AKA authentication algorithm to be used in the authentication with the second access system.

46. The apparatus according to claim 45, wherein the over-the-air provisioned authentication credentials include AKA authentication related parameters, and wherein the AKA authentication related parameters include at least one of whether to use f5 for SQN concealment and the configuration of one or more SQN numbers for AKA SQN management.

47. The apparatus according to claim 45, wherein the over-the-air provisioned authentication credentials include the AKA authentication algorithm to be used in the authentication with the second access system, and wherein performing over-the-air provisioning of authentication credentials includes performing over-the-air customization of the authentication algorithm from the first access system.

48. The apparatus according to claim 47, wherein the AKA authentication algorithm is MILENAGE, and wherein customization of the authentication algorithm includes customization of an OP or an OPc parameter.

49. The apparatus according to claim 47, wherein the first access system is a CDMA2000 system.

50. The apparatus according to claim 49, wherein the over-the-air nrovisionina is nerformed via Over-the-Air Service Provisioning (OTASP).

51. The apparatus according to claim 49, wherein the over-the-air provisioning is performed via Internet-Over-the-Air (IOTA).

52. An apparatus for over-the-air provisioning, the apparatus comprising:
means for receiving a call origination from an access device at a first access system;
means for directing the call to a provisioning system;
means for determining the protocol capability of the access device; and
means for performing over-the-air provisioning of authentication credentials at the access device via the first access system, wherein the authentication credentials are for the second access system lacking any over-the-air provisioning procedure.

53. An apparatus comprising:
at least one processor configured to perform over-the-air provisioning, the processor comprising:
a first module for receiving a call origination from an access device at a first access system;
a second module for directing the call to a provisioning system;
a third module for determining the protocol capability of the access device; and
a fourth module for performing over-the-air provisioning of authentication credentials at the access device via the first access system, wherein the authentication credentials are for the second access system lacking any over-the-air provisioning procedure.

54. A computer program product, comprising:
a non-transitory computer-readable medium comprising:
a first set of codes for causing a computer to receive a call origination from an access device at a first access system;
a second set of codes for causing a computer to direct the call to a provisioning system;
a third set of codes for causing a computer to determine the protocol capability of the access device; and
a fourth set of codes for causing a computer to perform over-the-air provisioning of authentication credentials at the access device via the first access system, wherein the authentication credentials are for the second access system lacking any over-the-air provisioning procedure.

\* \* \* \* \*